United States Patent
Jean-Baptiste-Dit-Dominique et al.

(10) Patent No.: US 12,091,540 B2
(45) Date of Patent: Sep. 17, 2024

(54) GRAFTED POLYMER BEARING PENDENT CYCLIC CARBONATE FUNCTIONAL GROUPS

(71) Applicant: COMPAGNIE GENERALE DES ETABLISSEMENTS MICHELIN, Clermont-Ferrand (FR)

(72) Inventors: Francois Jean-Baptiste-Dit-Dominique, Clermont-Ferrand (FR); Adeline Jasselin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 501 days.

(21) Appl. No.: 17/418,141

(22) PCT Filed: Dec. 19, 2019

(86) PCT No.: PCT/FR2019/053189
§ 371 (c)(1),
(2) Date: Jun. 24, 2021

(87) PCT Pub. No.: WO2020/136331
PCT Pub. Date: Jul. 2, 2020

(65) Prior Publication Data
US 2022/0098400 A1  Mar. 31, 2022

(30) Foreign Application Priority Data
Dec. 27, 2018 (FR) ........................ 1874235

(51) Int. Cl.
*C08F 279/02* (2006.01)
*C08L 51/04* (2006.01)
*C08C 19/22* (2006.01)

(52) U.S. Cl.
CPC .............. *C08L 51/04* (2013.01); *C08C 19/22* (2013.01); *C08F 279/02* (2013.01)

(58) Field of Classification Search
None
See application file for complete search history.

(56) References Cited

U.S. PATENT DOCUMENTS

| | | | |
|---|---|---|---|
| 7,199,175 | B2 | 4/2007 | Vasseur |
| 7,900,667 | B2 | 3/2011 | Vasseur |
| 10,711,071 | B2 * | 7/2020 | Jean-Baptiste-Dit-Dominique ..... B60C 1/00 |
| 10,920,046 | B2 | 2/2021 | Jean-Baptiste-Dit-Dominique et al. |
| 2003/0212185 | A1 | 11/2003 | Vasseur |
| 2007/0112120 | A1 | 5/2007 | Vasseur |
| 2013/0131279 | A1 * | 5/2013 | Araujo Da Silva . C07D 233/36 525/333.1 |
| 2019/0276648 | A1 | 9/2019 | Jean-Baptiste-Dit-Dominique et al. |
| 2022/0235164 | A1 | 7/2022 | Dit Dominique |

FOREIGN PATENT DOCUMENTS

| | | | | |
|---|---|---|---|---|
| EP | 3269708 | A1 * | 1/2018 | ........... C07C 291/06 |
| WO | 02/10269 | A2 | 2/2002 | |
| WO | 2012/007441 | A1 | 1/2012 | |
| WO | 2018/015645 | A1 | 1/2018 | |
| WO | 2018/015646 | A1 | 1/2018 | |
| WO | 2018/109396 | A1 | 6/2018 | |
| WO | WO-2021023948 | A1 * | 2/2021 | ........... C07D 233/34 |

OTHER PUBLICATIONS

International Search Report dated Mar. 10, 2020, in corresponding PCT/FR2019/053189 (5 pages).
L. Soos, et al., "Anionic Bulk Oligomerization of Ethylene and Propylene Carbonate Initiated by Bispenol-A-/Base Systems", J. Polymer Sci.: Part A: Polymer Chemistry, vol. 37, pp. 545-550 (1999).
A.P. Yakubov, et al., "Synthesis of Sterically Hindered Aromatic Aldehydes", Bulletin of the Academy of Sciences of the USSR, Division of Chemical Science, vol. 40, No. 7.2, pp. 1427-1432 (1991).

* cited by examiner

Primary Examiner — Richard A Huhn
(74) Attorney, Agent, or Firm — VENABLE LLP

(57) ABSTRACT

A modified polymer is obtained by grafting at least one compound of formula (I) to at least one unsaturation of the chain of an initial polymer

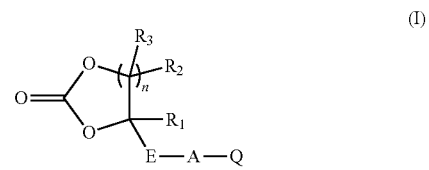

in which Q represents a dipole comprising at least one nitrogen atom; A represents an arenediyl ring, optionally substituted by one or more hydrocarbon-based chains, which are identical or different, independent of one another, and are optionally substituted or interrupted by one or more heteroatoms; E represents a divalent hydrocarbon-based bonding group which may optionally contain one or more heteroatoms; $R_1$, $R_2$ and $R_3$ represent, independently of one another, a hydrogen atom or a hydrocarbon-based chain which is optionally substituted or interrupted by one or more heteroatoms; and n is an integer having a value greater than or equal to 1.

15 Claims, No Drawings

GRAFTED POLYMER BEARING PENDENT CYCLIC CARBONATE FUNCTIONAL GROUPS

The present invention relates to novel polymers functionalized post-polymerization by grafting and to rubber compositions comprising such modified polymers.

TECHNICAL BACKGROUND

In the industrial field, mixtures of polymers with fillers are often used. In order for such mixtures to exhibit good properties, there is a continual search for means for improving the dispersion of the fillers within the polymers.

In particular for rubber compositions intended for the manufacture of tyres, manufacturers are continuously searching for filler-comprising rubber compositions possessing good mechanical properties, such as reinforcement, and as low a hysteresis as possible, which is synonymous with a low rolling resistance.

It is known that, generally, in order to obtain the optimum reinforcing properties conferred by a reinforcing filler, it is advisable for the latter to be present in the elastomeric matrix in a final form which is both as finely divided as possible and as homogeneously distributed as possible. In point of fact, such conditions can only be achieved in so far as the reinforcing filler exhibits a very good ability, on the one hand, to be incorporated in the elastomeric matrix during the mixing with the elastomer and to deagglomerate and, on the other hand, to disperse homogeneously in this matrix.

In an entirely known way, carbon black exhibits such abilities, which is not generally the case with inorganic fillers. This is because, for reciprocal affinity reasons, the inorganic filler particles have an unfortunate tendency to clump together in the elastomeric matrix. These interactions have the harmful effects of limiting the dispersion of the filler and therefore of limiting the reinforcing properties to a level substantially below that which it would be theoretically possible to achieve if all the (reinforcing filler/elastomer) bonds capable of being created during the mixing operation were actually obtained.

Numerous solutions have already been experimented with in order to achieve a good dispersion of the reinforcing filler in a rubber composition and to obtain rubber compositions exhibiting good reinforcing properties and also a reduction in hysteresis.

Mention may in particular be made of the modification of the structure of the polymers at the end of polymerization by means of functionalization agents, coupling agents or star-branching agents with the aim of obtaining a good interaction between the polymer, thus modified, and the reinforcing filler, whether this is carbon black or a reinforcing inorganic filler. Mention may be made, for example, of diene elastomers including functional groups comprising a carbon-tin bond, aminated functional groups, such as aminobenzophenone, and silanol or polysiloxane functional groups having a silanol end.

In particular, document WO2018015645 discloses a terpolymer of styrene, butadiene and 4-(hydroxymethyl)-1,3-dioxolan-2-one methacrylate bearing pendant carbonate functions along its main chain. Compared to an ungrafted SBR copolymer, this terpolymer confers better reinforcement on the rubber composition containing it. This terpolymer is obtained by radical polymerization.

However, there is therefore still a constant need to have modified polymers, in particular modified elastomers, which make it possible to obtain rubber compositions which have improved properties compared to prior art rubber compositions.

This need is met by virtue of novel grafted polymers bearing pendant cyclic carbonate functions along their chain. These novel polymers bearing cyclic carbonate functions and obtained by post-polymerization functionalization by grafting can advantageously have any kind of microstructure. Lastly, these novel polymers confer better reinforcing properties and better hysteretic properties on the rubber compositions comprising them.

SUMMARY OF THE INVENTION

A subject of the invention is therefore a modified polymer obtained by grafting at least one compound of formula (I) to at least one unsaturation of the chain of an initial polymer

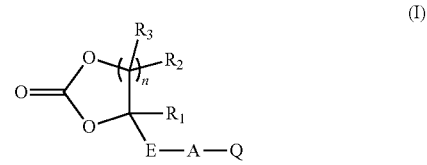

in which:
Q represents a dipole comprising at least one nitrogen atom;
A represents an arenediyl ring, optionally substituted by one or more hydrocarbon-based chains, which are identical or different, independent of one another, and are optionally substituted or interrupted by one or more heteroatoms;
E represents a divalent hydrocarbon-based bonding group which may optionally contain one or more heteroatoms;
$R_1$, $R_2$ and $R_3$ represent, independently of one another, a hydrogen atom or a hydrocarbon-based chain which is optionally substituted or interrupted by one or more heteroatoms; and
n is an integer having a value greater than or equal to 1.

According to a preferred embodiment, the initial polymer is an elastomer, preferably a diene elastomer.

According to a preferred embodiment, the diene elastomer is selected from the group consisting of ethylene/propylene/diene monomer copolymers, butyl rubber, natural rubber, synthetic polyisoprenes, polybutadienes, butadiene copolymers, isoprene copolymers and mixtures of these elastomers.

According to a preferred embodiment, the molar degree of grafting of the compound of formula (I) in the polymer is within a range extending from 0.01% to 15%, preferably from 0.05% to 10%, more preferentially from 0.07% to 5%.

Advantageously, the group Q is a group of formula (II), (III) or (IV)

in which:

the symbol * represents the attachment of Q to A; and $R_4$, $R_5$ and $R_6$ are independently selected from a hydrogen atom, a linear or branched $C_1$-$C_{20}$ alkyl, a $C_3$-$C_{30}$ cycloalkyl which is optionally substituted by a hydrocarbon-based chain, and a $C_6$-$C_{20}$ aryl which is optionally substituted by a hydrocarbon-based chain.

Advantageously, the group A is a $C_6$-$C_{14}$ arenediyl ring optionally substituted by one or more hydrocarbon-based chains, which are identical or different, independent of one another, and are optionally substituted or interrupted by one or more heteroatoms.

According to a preferred embodiment, the compound of formula (I) is selected from the compounds of formulae (Ia) and (Ib)

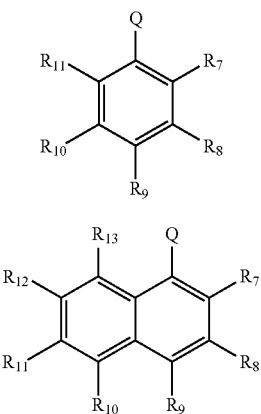

(Ia)

(Ib)

in which:

the group Q is as defined above;

one group selected from $R_7$ to $R_{11}$ of the formula (Ia) and one group selected from $R_7$ to $R_{13}$ of the formula (Ib) denotes the following group of formula (V):

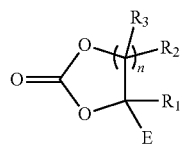

(V)

in which:

n, E, $R_1$, $R_2$ and $R_3$ are as defined above, the four other groups of the formula (Ia) and the six other groups of the formula (Ib), which are identical or different, independently of one another represent a hydrogen atom or a linear or branched, preferably saturated hydrocarbon-based chain which is optionally substituted or interrupted by one or more heteroatoms.

According to a preferred embodiment, the compound of formula (I), in which the group Q is a nitrile oxide, is selected from the compounds of formula (VI)

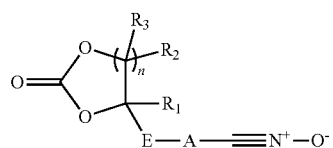

(VI)

in which:

A is as defined above,

E represents a divalent hydrocarbon-based bonding group which may optionally contain one or more heteroatoms;

$R_1$, $R_2$ and $R_3$ represent, independently of one another, a hydrogen atom or a hydrocarbon-based chain which is optionally substituted or interrupted by one or more heteroatoms; and n is an integer having a value greater than or equal to 1.

Advantageously, n=1, 2, 3 or 4, preferentially n=1 or 2, more preferentially n=1.

Advantageously, the group E is selected from the group consisting of —R— and —OR—, where R is a linear or branched $C_1$-$C_{24}$, preferably $C_1$-$C_{10}$, more preferentially $C_1$-$C_6$, alkylene.

Advantageously, the groups $R_1$, $R_2$ and $R_3$ represent, independently of one another, a hydrogen atom or a linear or branched $C_1$-$C_{24}$, preferentially $C_1$-$C_{10}$, more preferentially $C_1$-$C_6$, alkyl.

According to a preferred embodiment, the compound of formula (I) is selected from the group consisting of the compound of formula (VII) and the compound of formula (VIII)

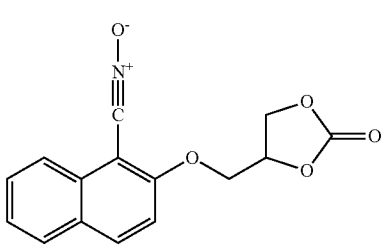

(VII)

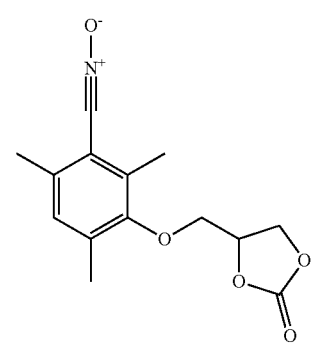

(VIII)

Another subject of the present invention is a process for preparing a modified polymer, said process comprising a step of grafting, to an initial polymer comprising at least one unsaturation, a compound of formula (I) as defined above by [3+2] cycloaddition of the function Q of the compound of formula (I) to said unsaturation.

According to a preferred embodiment of the process, the compound of formula (VI) is selected from the group consisting of the compound of formula (VII) and the compound of formula (VIII)

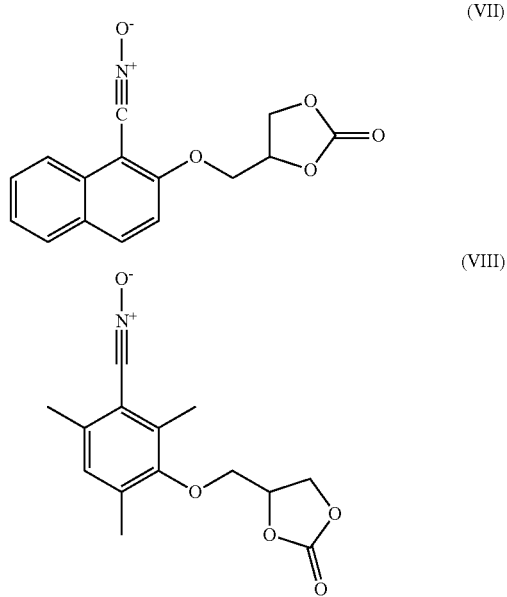

Another subject of the present invention is a composition comprising at least one modified polymer as defined above and at least one additive.

DETAILED DESCRIPTION

A first subject of the present invention relates to a modified polymer obtained by grafting at least one compound of formula (I) to at least one unsaturation of the chain of an initial polymer

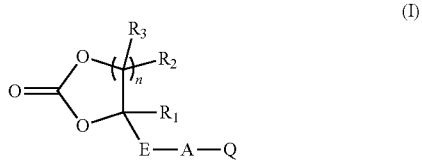

in which:
Q represents a dipole comprising at least one nitrogen atom;
A represents an arenediyl ring, optionally substituted by one or more hydrocarbon-based chains, which are identical or different, independent of one another, and are optionally substituted or interrupted by one or more heteroatoms;
E represents a divalent hydrocarbon-based bonding group which may optionally contain one or more heteroatoms;
$R_1$, $R_2$ and $R_3$ represent, independently of one another, a hydrogen atom or a hydrocarbon-based chain which is optionally substituted or interrupted by one or more heteroatoms; and
n is an integer having a value greater than or equal to 1.

In the present document, unless expressly indicated otherwise, all the percentages (%) indicated are percentages (%) by mass.

Moreover, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The compounds comprising carbon mentioned in the description can be of fossil or biobased origin. In the latter case, they can result, partially or completely, from biomass or be obtained from renewable starting materials resulting from biomass. Polymers, plasticizers, fillers, and the like, are concerned in particular.

The term "polymer modified by grafting" is understood to mean a polymer comprising functions, in particular cyclic carbonate functions, which have been introduced into the chain of the polymer subsequent to its polymerization. In practice, the modified polymer is obtained by a reaction of grafting a compound bearing cyclic carbonate functions and bearing a function capable of forming a covalent bond with an unsaturation of the chain of the polymer. The grafting reaction is therefore the binding via a covalent bond of the compound of formula (I) bearing cyclic carbonate functions to unsaturations of the chain of the polymer.

As is known, a polymer generally comprises at least one main polymer chain. This polymer chain can be considered to be the main chain as long as all the other chains of the polymer are considered to be pendant chains, as mentioned in the document "Glossary of basic terms in polymer science" (IUPAC recommendations 1996), PAC, 1996, 68, 2287, p. 2294.

The term "unsaturation" is understood to mean a multiple covalent bond between two carbon atoms; this multiple covalent bond may be a carbon-carbon double bond or a carbon-carbon triple bond, preferably a carbon-carbon double bond.

For the purposes of the present invention, the term "initial polymer chain" is understood to mean the chain of the polymer prior to the grafting reaction, this chain comprising at least one unsaturation capable of reacting with the compound of formula (I) described above. The initial polymer is therefore the polymer serving as starting reactant in the grafting reaction. The grafting reaction makes it possible to obtain a modified polymer starting from an initial polymer.

As indicated above, the initial polymer is a polymer comprising in its chain at least one unsaturation capable of reacting with the compound of formula (I) described above; this initial polymer is preferably an elastomer.

Even more preferentially, the initial polymer is an elastomer, preferably a diene elastomer.

"Diene" elastomer (or, without distinction, rubber), whether natural or synthetic, should be understood, in a known way, as meaning an elastomer composed, at least in part (i.e., a homopolymer or a copolymer), of diene monomer units (monomers bearing two conjugated or non-conjugated carbon-carbon double bonds).

These diene elastomers can be classified into two categories: "essentially unsaturated" or "essentially saturated". "Essentially unsaturated" is understood generally to mean a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not fall within the above definition and can in particular be described as "essentially saturated" diene elastomers (low or very low content of units of diene origin, always less than 15%).

Diene elastomer capable of being used in the context of the present invention is understood particularly to mean:
- any homopolymer of a conjugated or non-conjugated diene monomer having from 4 to 18 carbon atoms;
- any copolymer of a conjugated or non-conjugated diene having from 4 to 18 carbon atoms and of at least one other monomer.

The other monomer can be ethylene, an olefin or a conjugated or non-conjugated diene.

Suitable as conjugated dienes are conjugated dienes having from 4 to 12 carbon atoms, especially 1,3-dienes, such as, in particular, 1,3-butadiene and isoprene.

Suitable as non-conjugated dienes are non-conjugated dienes having from 6 to 12 carbon atoms, such as 1,4-hexadiene, ethylidenenorbornene or dicyclopentadiene.

Suitable as olefins are vinylaromatic compounds having from 8 to 20 carbon atoms and aliphatic α-monoolefins having from 3 to 12 carbon atoms.

Suitable as vinylaromatic compounds are, for example, styrene, ortho-, meta- or para-methylstyrene, the "vinyltoluene" commercial mixture or para-(tert-butyl)styrene.

Suitable as aliphatic α-monoolefins are in particular acyclic aliphatic α-monoolefins having from 3 to 18 carbon atoms.

More particularly, the diene elastomer is:
- any homopolymer of a conjugated diene monomer, in particular any homopolymer obtained by polymerization of a conjugated diene monomer having from 4 to 12 carbon atoms;
- any copolymer obtained by copolymerization of one or more conjugated dienes with one another or with one or more vinylaromatic compounds having from 8 to 20 carbon atoms;
- a copolymer of isobutene and of isoprene (butyl rubber) and also the halogenated versions, in particular chlorinated or brominated versions, of this type of copolymer;
- any copolymer obtained by copolymerization of one or more conjugated or non-conjugated dienes with ethylene, an α-monoolefin or a mixture thereof, such as, for example, the elastomers obtained from ethylene, from propylene with a non-conjugated diene monomer of the abovementioned type.

Preferentially, the diene elastomer is selected from the group consisting of ethylene/propylene/diene monomer (EPDM) copolymers, butyl rubber (IRR), natural rubber (NR), synthetic polyisoprenes (IRs), polybutadienes (BRs), butadiene copolymers, isoprene copolymers and mixtures of these elastomers.

Preferentially, the diene elastomer is selected from the group consisting of ethylene/propylene/diene monomer (EPDM) copolymers, butyl rubber (IRR), natural rubber (NR), synthetic polyisoprenes (IRs), polybutadienes (BRs), butadiene/styrene copolymers (SBRs), ethylene/butadiene copolymers (EBRs), isoprene/butadiene copolymers (BIRs) or isoprene/butadiene/styrene copolymers (SBIRs), isobutene/isoprene copolymers (butyl rubber—IIR), isoprene/styrene copolymers (SIRs), and mixtures of these elastomers.

Preferentially, the diene elastomer is selected from the group consisting of ethylene/propylene/diene monomer copolymers, butyl rubber, and a mixture of these rubbers.

The diene elastomer is preferentially selected from the group consisting of natural rubber, synthetic polyisoprenes, polybutadienes, butadiene copolymers, isoprene copolymers and the mixtures of these elastomers. More preferentially, the diene elastomer is selected from the group consisting of natural rubber, synthetic polyisoprenes, polybutadienes, butadiene/styrene copolymers, ethylene/butadiene copolymers, isoprene/butadiene copolymers, isoprene/butadiene/styrene copolymers, isobutene/isoprene copolymers, isoprene/styrene copolymers, and the mixtures of these elastomers.

Preferentially, the diene elastomer is selected from the group consisting of polybutadienes, butadiene copolymers, isoprene copolymers and the mixtures of these elastomers. More preferentially, the diene elastomer is selected from the group consisting of polybutadienes, butadiene/styrene copolymers, ethylene/butadiene copolymers, isoprene/butadiene copolymers, isoprene/butadiene/styrene copolymers, isobutene/isoprene copolymers, isoprene/styrene copolymers, and the mixtures of these elastomers.

The following are suitable: polybutadienes and in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature (Tg, measured according to ASTM D3418-08)) of between 0° C. and −90° C. and more particularly between −10° C. and −70° C., a styrene content of between 1% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −40° C. to −80° C., or isoprene/styrene copolymers and especially those having a styrene content of between 5% and 50% by weight and a Tg of between −5° C. and −50° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

The initial polymers which can be used in the context of the invention, preferably the elastomers, more preferentially the diene elastomers, can have any microstructure which depends on the polymerization conditions used. These polymers can, for example, be block, random, sequential or microsequential polymers and can be prepared in dispersion, in emulsion or in solution. They can be coupled and/or star-branched, for example by means of a silicon or tin atom which connects the polymer chains together.

According to the invention, the initial polymer, preferably the elastomer, even more preferentially the diene elastomer, having an unsaturation, preferably a carbon-carbon double bond, is modified by grafting a compound of formula (I) as defined above, also known as functionalization agent.

According to formula (I), this functionalization agent contains a group Q denoting a dipole comprising at least one nitrogen atom.

Within the meaning of the present invention, "dipole" is understood to mean a function capable of forming a 1,3-dipolar addition on an unsaturated carbon-carbon bond.

Preferably, the dipole comprising at least one nitrogen atom is selected from the group consisting of nitrile oxide, nitrone and nitrilimine.

Within the meaning of the present invention, the term "nitrile oxide" is understood to mean a dipole corresponding to the formula C≡N→O, including the mesomeric forms thereof.

Within the meaning of the present invention, the term "nitrilimine" is understood to mean a dipole corresponding to the formula C≡N→N, including the mesomeric forms thereof.

Within the meaning of the present invention, the term "nitrone" is understood to mean a dipole corresponding to the formula —C=N(→O), including the mesomeric forms thereof.

Even more preferentially, the group Q is a group of formula (II), (III) or (IV)

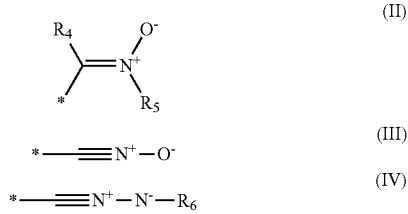

in which:
the symbol * represents the attachment of Q to A; and
$R_4$, $R_5$ and $R_6$ are independently selected from a hydrogen atom, a linear or branched $C_1$-$C_{20}$ alkyl, a $C_3$-$C_{30}$ cycloalkyl which is optionally substituted by a hydrocarbon-based chain, and a $C_6$-$C_{20}$ aryl which is optionally substituted by a hydrocarbon-based chain.

The term "hydrocarbon-based chain" is understood to mean a chain comprising one or more carbon atoms and one or more hydrogen atoms. The hydrocarbon-based chain can be saturated or unsaturated, preferably saturated, linear, branched or cyclic and can comprise from 1 to 24 carbon atoms.

Preferably, $R_4$, $R_5$ and $R_6$ are independently selected from a hydrogen atom, a linear or branched $C_1$-$C_{20}$ alkyl, a $C_3$-$C_{30}$ cycloalkyl which is optionally substituted by a saturated $C_1$-$C_{24}$ hydrocarbon-based chain, and a $C_6$-$C_{20}$ aryl which is optionally substituted by a saturated $C_1$-$C_{24}$ hydrocarbon-based chain. Even more preferentially, $R_4$, $R_5$ and $R_6$ are selected, independently of one another, from a hydrogen atom, a linear or branched $C_1$-$C_{20}$ alkyl, a $C_3$-$C_{30}$ cycloalkyl which is optionally substituted by a linear or branched $C_1$-$C_6$ alkyl, and a $C_6$-$C_{20}$ aryl which is optionally substituted by a linear or branched $C_1$-$C_6$ alkyl.

According to the formula (I), A represents an arenediyl ring, optionally substituted by one or more hydrocarbon-based chains, which are identical or different, independent of one another, and are optionally substituted or interrupted by one or more heteroatoms.

Within the meaning of the present invention, the term "arenediyl ring" is understood to mean a monocyclic or polycyclic aromatic hydrocarbon-based group derived from an arene in which 2 hydrogen atoms have been removed. An arenediyl ring is therefore a divalent group.

The term "monocyclic or polycyclic aromatic hydrocarbon-based group" is understood to mean one or more aromatic rings the backbone of which consists of carbon atoms. In other words, there are no heteroatoms in the backbone of the ring. The arenediyl ring may be monocyclic, i.e. made up of a single ring, or polycyclic, i.e. made up of a plurality of fused aromatic hydrocarbon rings; such fused rings then share at least two successive carbon atoms. These rings may be ortho-fused or ortho- and peri-fused. Preferably, the arenediyl ring comprises between 6 and 14 carbon atoms.

Preferably, when the arenediyl ring is substituted by one or more hydrocarbon-based chains, which are identical or different, independent of one another, and are optionally substituted or interrupted by one or more heteroatoms, this chain or these chains is/are inert with respect to the cyclic carbonate function and with respect to the group Q.

Within the meaning of the present invention, the term "hydrocarbon-based chain(s) which is/are inert with respect to the cyclic carbonate function and with respect to the group Q" is understood to mean a hydrocarbon-based chain which does not react either with said cyclic carbonate function or with said group Q. Therefore, said hydrocarbon-based chain which is inert with respect to said function and with respect to said group is, for example, a hydrocarbon-based chain which does not have any alkenyl or alkynyl functions which are capable of reacting with said function or with said group. Preferably, these hydrocarbon-based chains are saturated and can comprise from 1 to 24 carbon atoms.

Preferably, the group A is a $C_6$-$C_{14}$ arenediyl ring optionally substituted by one or more hydrocarbon-based chains, which are identical or different, independent of one another, and are optionally substituted or interrupted by one or more heteroatoms. More preferably, the group A is a, preferably $C_6$-$C_{14}$, arenediyl ring optionally substituted by one or more saturated $C_1$-$C_{24}$ hydrocarbon-based chains, which are identical or different and are optionally substituted or interrupted by one or more nitrogen, sulfur or oxygen heteroatoms. Even more preferentially, the group A is a $C_6$-$C_{14}$ arenediyl ring, optionally substituted by one or more $C_1$-$C_{12}$ (more preferentially $C_1$-$C_6$, even more preferentially $C_1$-$C_4$) identical or different alkyl groups or by a group selected from —OR', —NHR', and —SR', R' being an alkyl group, preferentially a $C_1$-$C_{12}$, more preferentially $C_1$-$C_6$, even more preferentially $C_1$-$C_4$, alkyl group.

Preferably, the compound of formula (I) is selected from the following compounds of formulae (Ia) and (Ib):

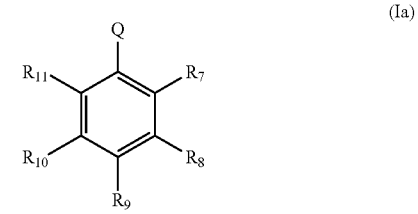

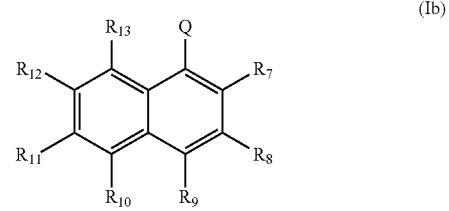

in which:
the group Q is as defined above; preferentially it is selected from the group consisting of nitrile oxide, nitrone and nitrilimine, more preferentially Q is the group of formula (III);
one group selected from $R_7$ to $R_{11}$ of the formula (Ia) and one group selected from $R_7$ to $R_{13}$ of the formula (Ib) denotes the following group of formula (V):

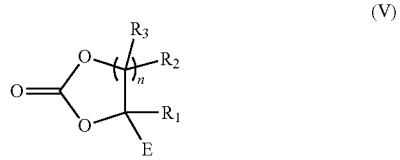

in which n, E, $R_1$, $R_2$ and $R_3$ are as defined above,
the four other groups of the formula (Ia) and the six other groups of the formula (Ib), which are identical or different, independently of one another represent a hydrogen atom or a linear or branched, preferably saturated hydrocarbon-based chain which is optionally substituted or interrupted by one or more heteroatoms.

Preferentially, said hydrocarbon-based chain in the compounds of formulae (Ia) and (Ib) is inert with respect to the group of formula (V) and with respect to the group Q. Preferentially, said hydrocarbon-based chain is saturated and can comprise from 1 to 24 carbon atoms.

Preferentially, said hydrocarbon-based chain is a $C_1$-$C_{12}$ (more preferentially $C_1$-$C_6$, even more preferentially $C_1$-$C_4$) alkyl or a group selected from —OR', —NHR', and —SR', R' being a $C_1$-$C_{12}$, more preferentially $C_1$-$C_6$, even more preferentially $C_1$-$C_4$, alkyl.

According to a preferred embodiment of the invention, in the formula (Ia) $R_8$ represents a group of formula (V) as defined above and $R_7$, $R_9$, $R_{10}$ and $R_{11}$, which are identical or different, represent a hydrogen atom or a linear or branched, preferably saturated $C_1$-$C_{24}$ hydrocarbon-based chain which is optionally substituted or interrupted by one or more heteroatoms. More preferentially, $R_8$ represents a group of formula (V) as defined above and $R_7$, $R_9$, $R_{10}$ and $R_{11}$, which are identical or different, represent a hydrogen atom or a $C_1$-$C_{12}$ (more preferentially $C_1$-$C_6$, even more preferentially $C_1$-$C_4$) alkyl or a group selected from —OR', —NHR', and —SR', R' being a $C_1$-$C_{12}$, more preferentially $C_1$-$C_6$, even more preferentially $C_1$-$C_4$, alkyl.

Even more preferentially in this embodiment, $R_8$ represents a group of formula (V) as defined above, $R_{10}$ represents a hydrogen atom and $R_7$, $R_9$ and $R_{11}$ represent a linear or branched, preferably saturated $C_1$-$C_{24}$ hydrocarbon-based chain which is optionally substituted or interrupted by one or more heteroatoms. Even more preferentially, $R_8$ represents a group of formula (V) as defined above, $R_{10}$ represents a hydrogen atom and $R_7$, $R_9$ and $R_{11}$ represent a $C_1$-$C_{12}$ (more preferentially $C_1$-$C_6$, even more preferentially $C_1$-$C_4$) alkyl or a group selected from —OR', —NHR', and —SR', R' being a $C_1$-$C_{12}$, more preferentially $C_1$-$C_6$, even more preferentially $C_1$-$C_4$, alkyl.

According to another preferred embodiment of the invention, in the formula (Ib) $R_7$ represents a group of formula (V) as defined above and $R_8$ to $R_{13}$, which are identical or different, represent a hydrogen atom or a linear or branched, preferably saturated $C_1$-$C_{24}$ hydrocarbon-based chain which is optionally substituted or interrupted by one or more heteroatoms. More preferentially, $R_7$ represents a group of formula (V) as defined above and $R_8$ to $R_{13}$, which are identical or different, represent a hydrogen atom or a $C_1$-$C_{12}$ (more preferentially $C_1$-$C_6$, even more preferentially $C_1$-$C_4$) alkyl or a group selected from —OR', —NHR', and —SR', R' being a $C_1$-$C_{12}$, more preferentially $C_1$-$C_6$, even more preferentially $C_1$-$C_4$, alkyl. Even more preferentially in this embodiment, $R_7$ represents a group of formula (V) as defined above and $R_8$ to $R_{13}$, which are identical, represent a hydrogen atom.

According to the compounds of formulae (I), (Ia) and (Ib), the group E is a divalent hydrocarbon-based bonding group which may optionally contain one or more heteroatoms.

Within the meaning of the present invention, the term "divalent hydrocarbon-based bonding group" is understood to mean a spacer group forming a bridge between the group A and the group of formula (V), this spacer group being a linear or branched, saturated or unsaturated, preferably saturated, $C_1$-$C_{24}$ hydrocarbon-based chain which may optionally contain one or more heteroatoms such as for example N, O and S. Said hydrocarbon-based chain may optionally be substituted, provided that the substituents do not react with the group Q and the group of formula (V) as defined above.

Preferentially, in the compounds of formulae (I), (Ia) and (Ib), the group E is a linear or branched, preferably saturated, $C_1$-$C_{24}$, more preferentially $C_1$-$C_{10}$, even more preferentially $C_1$-$C_6$, hydrocarbon-based chain which is optionally interrupted by one or more nitrogen, sulfur or oxygen atoms.

Preferably, in the compounds of formulae (I), (Ia) and (Ib), the group E is selected from the group consisting of —R—, —NH—R—, —O—R— and —S—R—, R being a linear or branched $C_1$-$C_{24}$, preferably $C_1$-$C_{10}$, more preferentially $C_1$-$C_6$, alkylene.

Even more preferentially, in the compounds of formulae (I), (Ia) and (Ib), the group E is selected from the group consisting of —R— and —O—R—, R being a linear or branched $C_1$-$C_{24}$, preferably $C_1$-$C_{10}$, more preferentially $C_1$-$C_6$, alkylene.

Even more preferentially, in the compounds of formulae (I), (Ia) and (Ib), the group E is selected from —$CH_2$—, —$CH_2$—$CH_2$—, —$CH_2$—$CH_2$—$CH_2$—, —$CH_2$—$CH_2$—$CH_2$—$CH_2$—, —O—$CH_2$—, —O—$CH_2$—$CH_2$—, —O—$CH_2$—$CH_2$—$CH_2$— and —O—$CH_2$—$CH_2$—$CH_2$—$CH_2$—.

In the compounds of formulae (I), (Ia) and (Ib), n is an integer greater than or equal to 1, more preferentially n is an integer having a value of 1, 2, 3 or 4; more preferentially n is an integer having a value of 1 or 2, even more preferentially n=1.

In the compounds of formulae (I), (Ia) and (Ib), $R_1$, $R_2$ and $R_3$ represent, independently of one another, a hydrogen atom or a hydrocarbon-based chain which is optionally substituted or interrupted by one or more heteroatoms, such as for example N, O and S. More preferentially, the groups $R_1$, $R_2$ and $R_3$ represent, independently of one another, a hydrogen atom or a linear or branched $C_1$-$C_{24}$, preferentially $C_1$-$C_{10}$, more preferentially $C_1$-$C_6$, alkyl. Even more preferentially, the group $R_1$ is a hydrogen atom and the groups $R_2$ and $R_3$, which are identical or different, are linear or branched $C_1$-$C_{24}$, preferentially $C_1$-$C_{10}$, more preferentially $C_1$-$C_6$, alkyls. Even more preferentially, $R_1$, $R_2$ and $R_3$, which are identical, are a hydrogen atom.

Preferentially, among the compounds of formula (I), particular preference is given to the compounds of formula (VI)

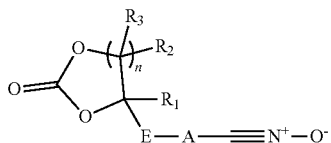

(VI)

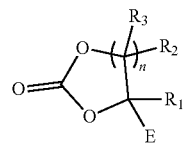

(V)

in which:
A represents an arenediyl ring, optionally substituted by one or more hydrocarbon-based chains, which are identical or different, independent of one another, and are optionally substituted or interrupted by one or more heteroatoms;
E represents a divalent hydrocarbon-based group which may optionally contain one or more heteroatoms;
$R_1$, $R_2$ and $R_3$ represent, independently of one another, a hydrogen atom or a hydrocarbon-based chain which is optionally substituted or interrupted by one or more heteroatoms; and
n is an integer having a value greater than or equal to 1.

Preferably, in the compounds of formula (VI), the group A is a, preferably $C_6$-$C_{14}$, arenediyl ring which is optionally substituted by one or more, preferably saturated, $C_1$-$C_{24}$ hydrocarbon-based chains, which are identical or different, independent of one another, and are optionally substituted or interrupted by one or more heteroatoms for example, such as O, N and S. More preferably, the group A is a $C_6$-$C_{14}$ arenediyl ring which is optionally substituted by one or more identical or different $C_1$-$C_{12}$ (more preferably $C_1$-$C_6$, even more preferentially $C_1$-$C_4$) alkyl groups or by a group selected from —OR', —NHR', and —SR', R' being a $C_1$-$C_{12}$, more preferably $C_1$-$C_6$, even more preferentially $C_1$-$C_4$, alkyl group.

Even ore preferentially, among the compounds of formula (VI), particular preference is given to the compounds of formulae (VIa) and (VIb)

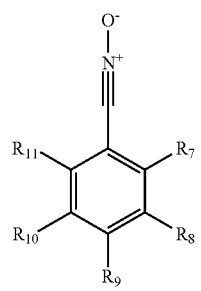

(VIa)

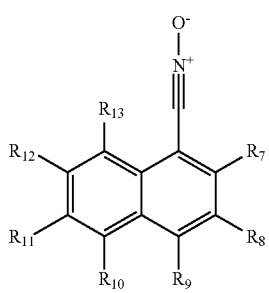

(VIb)

in which:
one group selected from $R_7$ to $R_{11}$ of the formula (VIa) and one group selected from $R_7$ to $R_{13}$ of the formula (VIb) denotes the following group of formula (V):

in which:
n, E, $R_1$, $R_2$ and $R_3$ are as defined above,
the four other groups of the formula (VIa) and the six other groups of the formula (VIb), which are identical or different, independently of one another represent a hydrogen atom or a linear or branched, preferably saturated $C_1$-$C_{24}$ hydrocarbon-based chain which is optionally substituted or interrupted by one or more heteroatoms. Preferentially, said hydrocarbon-based chain in the compounds of formulae (VIa) and (VIb) is inert with respect to the group of formula (V) and with respect to the group Q. Preferentially, said hydrocarbon-based chain is a $C_1$-$C_{12}$ (more preferentially $C_1$-$C_6$, even more preferentially $C_1$-$C_4$) alkyl or a group selected from —OR', —NHR', and —SR', R' being a $C_1$-$C_{12}$, more preferentially $C_1$-$C_6$, even more preferentially $C_1$-$C_4$, alkyl.

Preferentially, in the compounds of formulae (VI), (VIa) and (VIb), the group E is a linear or branched, preferably saturated $C_1$-$C_{24}$, more preferentially $C_1$-$C_{10}$, even more preferentially $C_1$-$C_6$, hydrocarbon-based chain which is optionally interrupted by one or more nitrogen, sulfur or oxygen atoms. Preferably, the group E is selected from the group consisting of —R—, —NHR—, —OR— and —SR—, R being a linear or branched $C_1$-$C_{24}$, preferably $C_1$-$C_{10}$, more preferentially $C_1$-$C_6$, alkylene. Even more preferentially, the group E is selected from the group consisting of —R— and —O—R—, R being a linear or branched $C_1$-$C_{24}$, preferably $C_1$-$C_{10}$, more preferentially $C_1$-$C_6$, alkylene. Even more preferentially, the group E is selected from —CH$_2$—, —CH$_2$—CH$_2$—, —CH$_2$—CH$_2$—CH$_2$—, —CH$_2$—CH$_2$—CH$_2$—CH$_2$—, —O—CH$_2$—, —O—CH$_2$—CH$_2$—, —O—CH$_2$—CH$_2$—CH$_2$— and —O—CH$_2$—CH$_2$—CH$_2$—CH$_2$—.

Preferentially, in the compounds of formulae (VI), (VIa) and (VIb), n is an integer greater than or equal to 1, more preferentially n is an integer having a value of 1, 2, 3 or 4; more preferentially n is an integer having a value of 1 or 2, even more preferentially n=1.

Preferentially, in the compounds of formulae (VI), (VIa) and (VIb), $R_1$, $R_2$ and $R_3$ represent, independently of one another, a hydrogen atom or a hydrocarbon-based chain which is optionally substituted or interrupted by one or more heteroatoms, such as for example N, O and S. More preferentially, the groups $R_1$, $R_2$ and $R_3$ represent, independently of one another, a hydrogen atom or a linear or branched $C_1$-$C_{24}$, preferentially $C_1$-$C_{10}$, more preferentially $C_1$-$C_6$, alkyl. Even more preferentially, the group $R_1$ is a hydrogen atom and the groups $R_2$ and $R_3$, which are identical or different, are linear or branched $C_1$-$C_{24}$, preferentially $C_1$-$C_{10}$, more preferentially $C_1$-$C_6$, alkyls. Even more preferentially, $R_1$, $R_2$ and $R_3$, which are identical, are a hydrogen atom.

According to a preferred embodiment of the invention, in the formula (VIa) $R_8$ represents a group of formula (V) as defined above and $R_7$, $R_9$, $R_{10}$ and $R_{11}$, which are identical or different, represent a hydrogen atom, a $C_1$-$C_{12}$ (more preferentially $C_1$-$C_6$, even more preferentially $C_1$-$C_4$) alkyl or a group selected from —OR', —NHR', and —SR', R' being a $C_1$-$C_{12}$, more preferentially $C_1$-$C_6$, even more preferentially $C_1$-$C_4$, alkyl.

Even more preferentially in this embodiment, $R_8$ represents a group of formula (V) as defined above, $R_{10}$ represents a hydrogen atom and $R_7$, $R_9$ and $R_{11}$ represent a $C_1$-$C_{12}$ (more preferentially $C_1$-$C_6$, even more preferentially $C_1$-$C_4$) alkyl or a group selected from —OR', —NHR', and —SR', R' being a $C_1$-$C_{12}$, more preferentially $C_1$-$C_6$, even more preferentially $C_1$-$C_4$, alkyl.

Among the compounds of formula (VIa), particular preference is given to those having the following characteristics:
  $R_7$, $R_9$ and $R_{11}$, which are identical or different, represent a $C_1$-$C_{12}$ (more preferentially $C_1$-$C_6$, even more preferentially $C_1$-$C_4$) alkyl or a group selected from —OR', —NHR', and —SR', R' being a $C_1$-$C_{12}$, more preferentially $C_1$-$C_6$, even more preferentially $C_1$-$C_4$, alkyl; and
  $R_{10}$ represents a hydrogen atom; and
  $R_8$ represents a group of formula (V) where n=1 or 2, preferably n=1, the group E is selected from the group consisting of —R— and —O—R—, R being a linear or branched $C_1$-$C_{24}$, preferably $C_1$-$C_{10}$, more preferentially $C_1$-$C_6$, alkylene, even more preferentially the group E is selected from —$CH_2$—, —$CH_2$—$CH_2$—, —$CH_2$—$CH_2$—$CH_2$—, —$CH_2$—$CH_2$—$CH_2$—$CH_2$—, —O—$CH_2$—, —O—$CH_2$—$CH_2$—, —O—$CH_2$—$CH_2$—$CH_2$— and —O—$CH_2$—$CH_2$—$CH_2$—$CH_2$— and the groups $R_1$, $R_2$ and $R_3$ represent, independently of one another, a hydrogen atom or a linear or branched $C_1$-$C_{24}$, preferentially $C_1$-$C_{10}$, more preferentially $C_1$-$C_6$, alkyl, and preferably are all identical and are a hydrogen atom.

According to another preferred embodiment of the invention, in the formula (VIb), $R_7$ represents a group of formula (V) as defined above and $R_8$ to $R_{13}$, which are identical or different, represent a hydrogen atom, a $C_1$-$C_{12}$ (more preferentially $C_1$-$C_6$, even more preferentially $C_1$-$C_4$) alkyl or a group selected from —OR', —NHR', and —SR', R' being a $C_1$-$C_{12}$, more preferentially $C_1$-$C_6$, even more preferentially $C_1$-$C_4$, alkyl. Even more preferentially in this embodiment, $R_7$ represents a group of formula (V) and $R_8$ to $R_{13}$, which are identical, represent a hydrogen atom.

Among the compounds of formula (VIb), particular preference is given to those having the following characteristics:
  $R_7$ represents a group of formula (V) where n=1 or 2, preferably n=1, the group E is selected from the group consisting of —R— and —O—R—, R being a linear or branched $C_1$-$C_{24}$, preferably $C_1$-$C_{10}$, more preferentially $C_1$-$C_6$, alkylene, even more preferentially the group E is selected from —$CH_2$—, —$CH_2$—$CH_2$—, —$CH_2$—$CH_2$—$CH_2$—, —$CH_2$—$CH_2$—$CH_2$—$CH_2$—, —O—$CH_2$—, —O—$CH_2$—$CH_2$—, —O—$CH_2$—$CH_2$—$CH_2$— and —O—$CH_2$—$CH_2$—$CH_2$—$CH_2$— and the groups $R_1$, $R_2$ and $R_3$ represent, independently of one another, a hydrogen atom or a linear or branched $C_1$-$C_{24}$, preferentially $C_1$-$C_{10}$, more preferentially $C_1$-$C_6$, alkyl, and preferably are all identical and are a hydrogen atom; and
  $R_8$ to $R_{13}$, which are identical or different, represent a hydrogen atom, a $C_1$-$C_{12}$ (more preferentially $C_1$-$C_6$, even more preferentially $C_1$-$C_4$) alkyl or a group selected from —OR', —NHR', and —SR', R' being a $C_1$-$C_{12}$, more preferentially $C_1$-$C_6$, even more preferentially $C_1$-$C_4$ alkyl; more preferentially $R_8$ to $R_{13}$, which are identical, represent a hydrogen atom.

According to a particular embodiment, the compound of formula (I), preferably the compound of formula (VI), is selected from the group consisting of the compound of formula (VII) and the compound of formula (VIII)

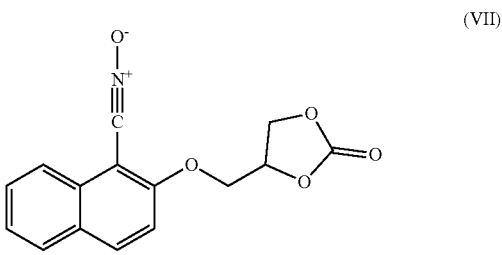

(VII)

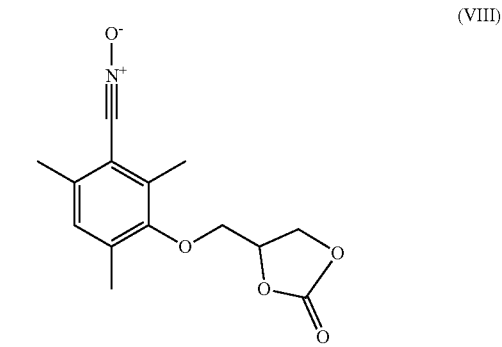

(VIII)

The functionalization agents of formula (VI) and also the preferred embodiments thereof can be obtained, for example, from a preparation process comprising at least a reaction (d) of an oxime compound of formula (IX) with an oxidizing agent in the presence of at least one organic solvent SL1 according to the following reaction scheme:

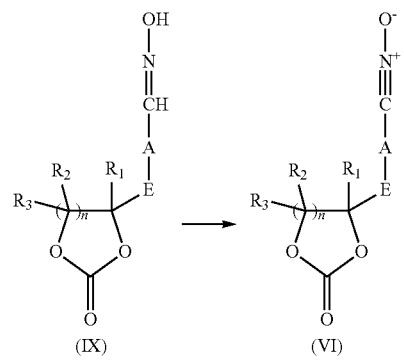

where:
  A represents an arenediyl ring, optionally substituted by one or more carbon-based chains, which are identical or different, independent of one another, and are optionally substituted or interrupted by one or more heteroatoms;
  E represents a divalent hydrocarbon-based group which may optionally contain one or more heteroatoms;
  $R_1$, $R_2$ and $R_3$ represent, independently of one another, a hydrogen atom or a hydrocarbon-based chain which is optionally substituted or interrupted by one or more heteroatoms; and
  n is an integer having a value greater than or equal to 1.

Preferred forms of A, E, $R_1$, $R_2$ and $R_3$ and n as described above also apply to the process for preparing a compound of formula (VI) from a compound of formula (IX).

Preferably, said oxidizing agent is selected from sodium hypochlorite, N-bromosuccinimide in the presence of a base, N-chlorosuccinimide in the presence of a base, and aqueous hydrogen peroxide solution in the presence of a catalyst. More preferentially, the catalyst is selected from the group consisting of sodium hypochlorite and N-chlorosuccinimide in the presence of a base.

Advantageously, the amount of oxidizing agent is from 1 to 5 molar equivalents, preferentially from 1 to 2 molar equivalents, relative to the molar amount of the oxime compound of formula (IX).

Preferentially, the organic solvent SL1 is selected from chlorinated solvents and solvents of ester, ether and alcohol type, more preferentially selected from dichloromethane, trichloromethane, ethyl acetate, butyl acetate, diethyl ether, isopropanol and ethanol, even more preferentially is selected from ethyl acetate, trichloromethane, dichloromethane and butyl acetate.

Preferably, the oxime compound of formula (IX) represents from 1% to 30% by weight, preferably from 1% to 20% by weight, relative to the total weight of the combination comprising said oxime compound of formula (IX), said organic solvent SL1 and said oxidizing agent.

The oxime compound of formula (IX) can be obtained from a preparation process comprising at least one reaction (c) of a compound of formula (X) with an aqueous solution of hydroxylamine $NH_2OH$ (compound of formula (XI)) according to the following reaction scheme:

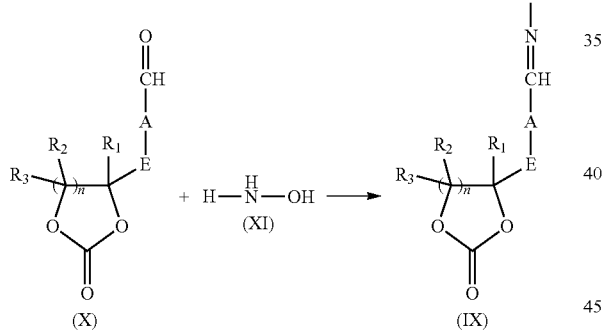

where:
A represents an arenediyl ring, optionally substituted by one or more carbon-based chains, which are identical or different, independent of one another, and are optionally substituted or interrupted by one or more heteroatoms;
E represents a divalent hydrocarbon-based group which may optionally contain one or more heteroatoms;
$R_1$, $R_2$ and $R_3$ represent, independently of one another, a hydrogen atom or a hydrocarbon-based chain which is optionally substituted or interrupted by one or more heteroatoms; and
n is an integer having a value greater than or equal to 1.

Preferred forms of A, E, $R_1$, $R_2$ and $R_3$ and n also apply to the process for preparing a compound of formula (IX) from a compound of formula (X).

Preferentially, the addition of hydroxylamine (compound of formula (XI)) is carried out at a temperature ranging from 1° C. to 100° C., more preferentially between 20° C. and 70° C.

Preferentially, the addition of the aqueous hydroxylamine solution required for the reaction described above is carried out in two stages.

More preferentially, the compound of formula (X) is contacted with a first amount of compound of formula (XI) within a range extending from 1.02 to 2 molar equivalents relative to the compound of formula (X), preferentially within a range extending from 1.1 to 1.75 molar equivalents; then 2 to 10 hours after this contacting a second amount of compound of formula (XI) is added to the reaction medium. This second amount of compound of formula (XI) is preferentially within a range extending from 0.25 to 1.5 molar equivalents relative to the compound of formula (X), preferentially between 0.25 and 0.75 molar equivalents.

The reaction described above can be adapted to obtain the compounds of formula (I) from the compound of formula (IX). In particular, the process for preparing the compound of formula (I) in which Q is a nitrone comprises at least a reaction of the compound of formula (X) with a hydroxylamine of formula $NR_4R_5$—OH where $R_4$ and $R_5$, which are identical or different (preferably different), are as defined above, including the preferred embodiments thereof.

The compound of formula (X) can be obtained by a preparation process comprising at least a reaction (b) of carbonating the compound of formula (XII) in the presence of $CO_2$, an organic solvent SL2 and a catalyst, according to the following reaction scheme:

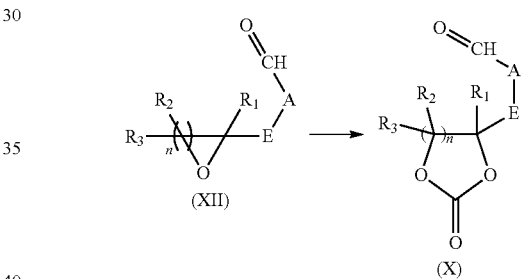

where:
A represents an arenediyl ring, optionally substituted by one or more carbon-based chains, which are identical or different, independent of one another, and are optionally substituted or interrupted by one or more heteroatoms;
E represents a divalent hydrocarbon-based group which may optionally contain one or more heteroatoms;
$R_1$, $R_2$ and $R_3$ represent, independently of one another, a hydrogen atom or a hydrocarbon-based chain which is optionally substituted or interrupted by one or more heteroatoms; and
n is an integer having a value greater than or equal to 1.

Preferred forms of A, E, $R_1$, $R_2$ and $R_3$ and n also apply to the process for preparing a compound of formula (X) from a compound of formula (XII).

The catalyst may be selected from the group consisting of ammonium salts, alkaline earth metal salts (such as for example zinc salts or cobalt salts), post-transition metal salts (such as aluminium salts, titanium salts or tin salts). Preferably, the catalyst is an ammonium salt, more preferentially is selected from the group consisting of tetrabutylammonium (TBAB) and tetrabutylammonium bromide.

The organic solvent SL2 is selected from chlorinated solvents and solvents of ester, ether, alcohol and amide type, more preferentially is selected from dichloromethane, trichloromethane, ethyl acetate, butyl acetate, diethyl ether, isopropanol and ethanol, N,N-dimethylformamide (DMF), 1,4-dioxane; even more preferentially is selected from DMF and 1,4-dioxane.

The compound of formula (XII) can be obtained by a preparation process comprising at least a reaction (a) of the compound of formula (XIII) with a compound of formula (XIV) in the presence of at least one base and at a temperature ranging from 20° C. to 150° C. according to the following reaction scheme:

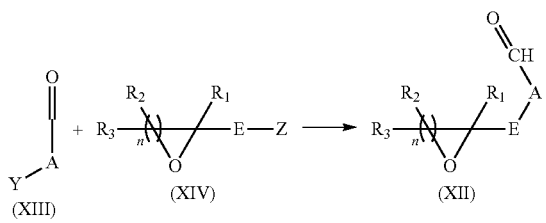

where.

A represents an arenediyl ring, optionally substituted by one or more carbon-based chains, which are identical or different, independent of one another, and are optionally substituted or interrupted by one or more heteroatoms;

E represents a divalent hydrocarbon-based group which may optionally contain one or more heteroatoms;

$R_1$, $R_2$ and $R_3$ represent, independently of one another, a hydrogen atom or a hydrocarbon-based chain which is optionally substituted or interrupted by one or more heteroatoms;

n is an integer having a value greater than or equal to 1,

Y represents a nucleophilic group, and

Z represents a nucleofuge group.

Preferred forms of A, E, $R_1$, $R_2$ and $R_3$ and n also apply to the process for preparing a compound of formula (XII) from compounds of formulae (XIII) and (XIV).

The term "nucleofuge group" is understood to mean a leaving group.

The term "nucleophilic group" is intended to mean a compound comprising at least one atom bearing a free electron pair or a negatively charged atom.

Preferably, the Y group is selected from hydroxyl, thiol, primary amine and secondary amine functions.

The Z group can be selected from chlorine, bromine, iodine, fluorine, the mesylate group, the tosylate group, the acetate group and the trifluoromethylsulfonate group.

More preferentially, the Y group is a hydroxyl function and the Z group is chlorine.

The reaction between the compound of formula (XIII) and that of formula (XIV) is carried out in the presence of at least one base and at a temperature ranging from 20° C. to 150° C.

The base can be selected from alkali metal alkoxides, alkali metal carbonates, alkaline earth metal carbonates, alkali metal hydroxides, alkaline earth metal hydroxides and mixtures thereof.

Preferentially, the base is selected from sodium methoxide, potassium carbonate and sodium hydroxide, more preferentially potassium carbonate.

Preferentially, the molar amount of base is from 1.5 to 8 molar equivalents, preferably from 2 to 6 molar equivalents, relative to the molar amount of compound of formula (XIII).

According to one embodiment, it is possible to add one or more catalysts selected from a catalyst of silver (I) salt type, a phase transfer catalyst of quaternary ammonium type, and mixtures thereof.

Compounds of formulae (XIII) and (XIV) as defined above are commercially available from suppliers such as Sigma-Aldrich, Merck, etc.

According to a preferred embodiment, the process for preparing a compound of formula (VI) comprises at least the following successive reactions: reaction (c) followed by reaction (d) as have been described above. Even more preferentially in this embodiment, the addition of the total amount of hydroxylamine is carried out in two stages in reaction (c).

According to another preferred embodiment, the process for preparing a compound of formula (VI) comprises at least the following successive reactions: reaction (a) followed by reaction (b) followed by reaction (c) and then followed by reaction (d) as have been described above. More preferentially in this preferred embodiment, the addition of the total amount of hydroxylamine is carried out in two stages in reaction (c).

The modified polymer, preferably elastomer, more preferentially diene elastomer, is obtained by grafting at least one compound of formula (I), in particular the compound of formula (VI), to at least one unsaturation of the chain of said initial polymer, preferably of said elastomer, more preferentially of said diene elastomer.

A subject of the invention is also a process for preparing a modified polymer, said process comprising a step of grafting, to an initial polymer comprising at least one unsaturation, a compound of formula (I), in particular a compound of formula (VI), as defined above, including the preferred embodiments thereof, by [3+2] cycloaddition of the group Q of the compound of formula (I), or respectively of the compound of formula (VI), to said unsaturation.

The grafting of the polymer is performed by reaction of said initial polymer with the group Q of the compound of formula (I), preferably of the compound of (VI). During this reaction, this group forms a covalent bond with the chain of the polymer. The grafting of the compound of formula (I), in particular of the compound of formula (VI), is carried out by [3+2] cycloaddition of the group Q and an unsaturation of the initial polymer chain. A [3+2] cycloaddition mechanism can be found in document WO 2012/007441.

According to the invention, the polymer bears, along the main polymer chain, one or more pendant groups derived from the grafting reaction of the compounds of formula (I), in particular of the compound of formula (VI), as defined above. Advantageously, these pendant groups are distributed randomly along the main polymer chain.

According to a preferred embodiment, the molar degree of grafting of the compound of formula (I), in particular of the compound of formula (VI), is within a range extending from 0.01% to 15%, preferably from 0.05% to 10%, more preferentially from 0.07% to 5%.

The term "molar degree of grafting" is understood to mean the number of moles of compound of formula (I), in particular of the compound of formula (VI), grafted to the polymer per 100 moles of monomer units constituting the polymer. The molar degree of grafting can be determined by conventional polymer analysis methods, such as for example $^1$H NMR analysis.

The grafting of the compound of formula (I), in particular of the compound of formula (VI), to the initial polymer can be carried out in bulk, for example in an internal mixer or in an external mixer such as an open mill. It can also be carried out in solution, continuously or batchwise.

The polymer thus modified can be separated from its solution by any type of means known to those skilled in the art and in particular by a steam stripping operation.

Preferably in the process of the invention, the initial polymer is an elastomer, even more preferentially is a diene elastomer.

More preferentially in the process of the invention, the compound of formula (I) is selected from the compounds of formula (VI)

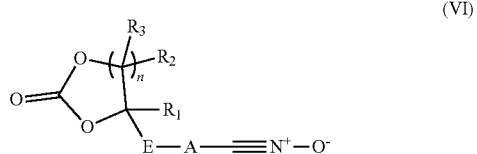

(VI)

in which:
- A represents an arenediyl ring, optionally substituted by one or more carbon-based chains, which are identical or different, independent of one another, and are optionally substituted or interrupted by one or more heteroatoms;
- E represents a divalent hydrocarbon-based group which may optionally contain one or more heteroatoms;
- $R_1$, $R_2$ and $R_3$ represent, independently of one another, a hydrogen atom or a hydrocarbon-based chain which is optionally substituted or interrupted by one or more heteroatoms; and
- n is an integer having a value greater than or equal to 1.

Even more preferentially in the process of the invention, the compound of formula (I), in particular the compound of formula (VI), is selected from the group consisting of the compound of formula (VII) and the compound of formula (VIII)

(VII)

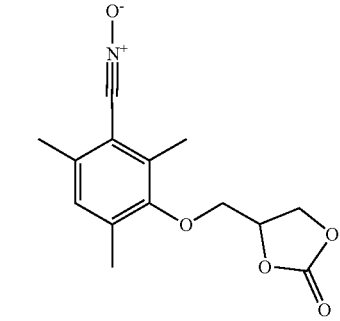

(VIII)

A subject of the invention is also a composition comprising at least one modified polymer as defined above and at least one additive.

The additives which can be used in the composition according to the invention may be plasticizers (such as plasticizing oils and/or plasticizing resins), (reinforcing or non-reinforcing) fillers, pigments, protective agents such as antiozone waxes, chemical antiozonants or antioxidants, anti-fatigue agents, reinforcing resins (such as described for example in the application WO 02/10269), and a crosslinking system, for example based on sulfur and other vulcanization agents, and/or on peroxide and/or on bismaleimide.

In addition to the subjects described above, the invention relates to at least one of the subjects described in the following points:

1. Modified polymer obtained by grafting at least one compound of formula (I) to at least one unsaturation of the chain of an initial polymer (I)

in which:
- Q represents a dipole comprising at least one nitrogen atom;
- A represents an arenediyl ring, optionally substituted by one or more hydrocarbon-based chains, which are identical or different, independent of one another, and are optionally substituted or interrupted by one or more heteroatoms;
- E represents a divalent hydrocarbon-based bonding group which may optionally contain one or more heteroatoms;
- $R_1$, $R_2$ and $R_3$ represent, independently of one another, a hydrogen atom or a hydrocarbon-based chain which is optionally substituted or interrupted by one or more heteroatoms; and
- n is an integer having a value greater than or equal to 1.

2. Modified polymer according to the preceding point, in which the initial polymer is an elastomer, preferably a diene elastomer.

3. Modified polymer according to point 2, in which the diene elastomer is selected from the group consisting of ethylene/propylene/diene monomer copolymers, butyl rubber, natural rubber, synthetic polyisoprenes, polybutadienes, butadiene copolymers, isoprene copolymers and mixtures of these elastomers.

4. Modified polymer according to point 2, in which the diene elastomer is selected from the group consisting of ethylene/propylene/diene monomer copolymers, butyl rubber, and the mixture of these rubbers.

5. Modified polymer according to point 2, in which the diene elastomer is selected from the group consisting of natural rubber, synthetic polyisoprenes, polybutadienes, butadiene copolymers, isoprene copolymers and mixtures of these elastomers.

6. Modified polymer according to point 2, in which the diene elastomer is selected from the group consisting of polybutadienes, butadiene copolymers, isoprene copolymers and mixtures of these elastomers.

7. Modified polymer according to point 2, in which the diene elastomer is selected from the group consisting of polybutadienes, styrene/butadiene copolymers, isobutene/ isoprene copolymers, ethylene/butadiene copolymers, isoprene/styrene copolymers, isoprene/butadiene copolymers, isoprene/butadiene/styrene copolymers and mixtures of these elastomers.

8. Modified polymer according to any one of points 1 to 7, in which the molar degree of grafting of the compound of formula (I) is within a range extending from 0.01% to 15%, preferably from 0.05% to 10%, more preferentially from 0.07% to 5%.

9. Modified polymer according to any one of points 1 to 8, in which the group Q is selected from the group consisting of nitrile oxide, nitrone and nitrilimine.

10. Modified polymer according to point 9, in which the group Q is a group of formula (II), (III) or (IV)

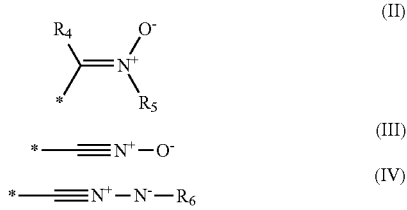

(II)

(III)

(IV)

in which:
the symbol * represents the attachment of Q to A; and
$R_4$, $R_5$ and $R_6$ are independently selected from a hydrogen atom, a linear or branched $C_1$-$C_{20}$ alkyl, a $C_3$-$C_{30}$ cycloalkyl which is optionally substituted by a hydrocarbon-based chain, and a $C_6$-$C_{20}$ aryl which is optionally substituted by a hydrocarbon-based chain.

11. Modified polymer according to any one of points 1 to 10, in which the group A is a $C_6$-$C_{14}$ arenediyl ring optionally substituted by one or more hydrocarbon-based chains, which are identical or different, independent of one another, and are optionally substituted or interrupted by one or more heteroatoms.

12. Modified polymer according to point 11, in which the compound of formula (I) is selected from the compounds of formulae (Ia) and (Ib)

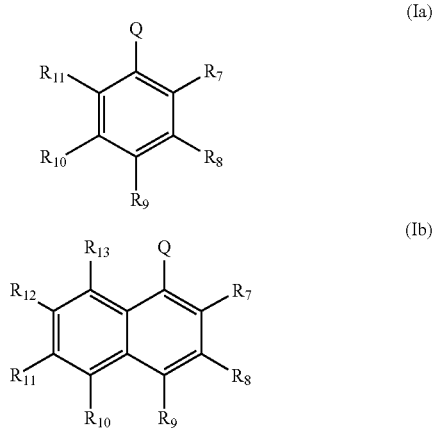

(Ia)

(Ib)

in which:
the group Q is as defined according to any one of points 1, 9 and 10;
one group selected from $R_7$ to $R_{11}$ of the formula (Ia) and one group selected from $R_7$ to $R_{13}$ of the formula (Ib) denotes the following group of formula (V):

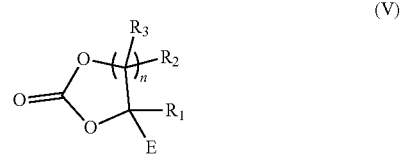

(V)

in which:
n, E, $R_1$, $R_2$ and $R_3$ are as defined above,
the four other groups of the formula (Ia) and the six other groups of the formula (Ib), which are identical or different, independently of one another represent a hydrogen atom or a linear or branched, preferably saturated hydrocarbon-based chain which is optionally substituted or interrupted by one or more heteroatoms.

13. Modified polymer according to point 10, in which the compound of formula (I) is selected from the compounds of formula (VI)

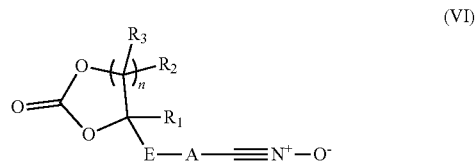

(VI)

in which:
A represents an arenediyl ring, optionally substituted by one or more carbon-based chains, which are identical or different, independent of one another, and are optionally substituted or interrupted by one or more heteroatoms;
E represents a divalent hydrocarbon-based group which may optionally contain one or more heteroatoms;
$R_1$, $R_2$ and $R_3$ represent, independently of one another, a hydrogen atom or a hydrocarbon-based chain which is optionally substituted or interrupted by one or more heteroatoms; and
n is an integer having a value greater than or equal to 1.

14. Modified polymer according to point 13, in which the group A is a $C_6$-$C_{14}$ arenediyl ring optionally substituted by one or more hydrocarbon-based chains, which are identical or different, independent of one another, and are optionally substituted or interrupted by one or more heteroatoms.

15. Modified polymer according to any one of points 1 to 14, in which n=1, 2, 3 or 4, preferentially n=1 or 2, more preferentially n=1.

16. Modified polymer according to any one of points 1 to 15, in which the group E is selected from a linear or branched, preferably saturated $C_1$-$C_{24}$, preferentially $C_1$-$C_{10}$, more preferentially $C_1$-$C_6$, hydrocarbon-based chain which is optionally interrupted by one or more nitrogen, sulfur or oxygen atoms.

17. Modified polymer according to any one of points 1 to 16, in which the group E is selected from the group consisting of —R— or —OR—, where R is a $C_1$-$C_{24}$, preferably $C_1$-$C_{10}$, more preferentially $C_1$-$C_6$, alkylene.

18. Modified polymer according to any one of points 1 to 17, in which the group E is selected from —CH$_2$—, —CH$_2$—CH$_2$—, —CH$_2$—CH$_2$—CH$_2$—, —CH$_2$—CH$_2$—CH$_2$—, —O—CH$_2$—, —O—CH$_2$—CH$_2$—, —O—CH$_2$—CH$_2$—CH$_2$— and —O—CH$_2$—CH$_2$—CH$_2$—CH$_2$—.

19. Modified polymer according to any one of points 1 to 18, in which the groups $R_1$, $R_2$ and $R_3$ represent, independently of one another, a hydrogen atom or a linear or branched $C_1$-$C_{24}$, preferentially $C_1$-$C_{10}$, more preferentially $C_1$-$C_6$, alkyl.

20. Modified polymer according to any one of points 1 to 19, in which the group $R_1$ is a hydrogen atom and the groups $R_2$ and $R_3$, which are identical or different, are linear or branched $C_1$-$C_{24}$, preferentially $C_1$-$C_{10}$, more preferentially $C_1$-$C_6$, alkyls.

21. Modified polymer according to any one of points 1 to 20, in which the groups $R_1$, $R_2$ and $R_3$ are a hydrogen atom.

22. Modified polymer according to any one of points 13 to 21, in which the compound of formula (I) is selected from the group consisting of the compound of formula (VII) and the compound of formula (VIII)

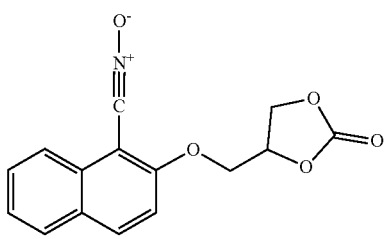

(VII)

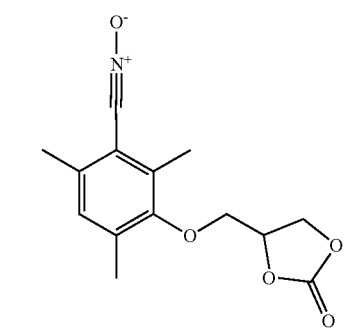

(VIII)

23. Process for preparing a modified polymer, said process comprising a step of grafting, to an initial polymer comprising at least one unsaturation, a compound of formula (I)

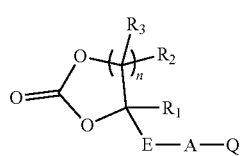

(I)

in which:
Q represents a dipole comprising at least one nitrogen atom;
A represents an arenediyl ring, optionally substituted by one or more hydrocarbon-based chains, which are identical or different, independent of one another, and are optionally substituted or interrupted by one or more heteroatoms;
E represents a divalent hydrocarbon-based bonding group which may optionally contain one or more heteroatoms;

$R_1$, $R_2$ and $R_3$ represent, independently of one another, a hydrogen atom or a hydrocarbon-based chain which is optionally substituted or interrupted by one or more heteroatoms; and
n is an integer having a value greater than or equal to 1,
by [3+2] cycloaddition of the group Q of the compound of formula (I) to said unsaturation.

24. Process according to point 23, in which the polymer comprising at least one unsaturation is an elastomer, preferably a diene elastomer.

25. Process according to point 24, in which the diene elastomer is selected from the group consisting of ethylene/propylene/diene monomer copolymers, butyl rubber, natural rubber, synthetic polyisoprenes, polybutadienes, butadiene copolymers, isoprene copolymers and mixtures of these elastomers.

26. Process according to point 24, in which the diene elastomer is selected from the group consisting of ethylene/propylene/diene monomer copolymers, butyl rubber, and the mixture of these rubbers.

27. Process according to point 24, in which the diene elastomer is selected from the group consisting of natural rubber, synthetic polyisoprenes, polybutadienes, butadiene copolymers, isoprene copolymers and mixtures of these elastomers.

28. Process according to point 24, in which the diene elastomer is selected from the group consisting of polybutadienes, butadiene copolymers, isoprene copolymers and mixtures of these elastomers.

29. Process according to point 24, in which the diene elastomer is selected from the group consisting of polybutadienes, styrene/butadiene copolymers, ethylene/butadiene copolymers, isobutene/isoprene copolymers, isoprene/styrene copolymers, isoprene/butadiene copolymers, isoprene/butadiene/styrene copolymers and mixtures of these elastomers.

30. Process according to any one of points 23 to 29, in which the molar degree of grafting of the compound of formula (I) is within a range extending from 0.01% to 15%, preferably from 0.05% to 10%, more preferentially from 0.07% to 5%.

31. Process according to any one of points 23 to 30, in which the group Q is selected from the group consisting of nitrile oxide, nitrone and nitrilimine.

32. Process according to point 31, in which the group Q is a group of formula (II), (III) or (IV)

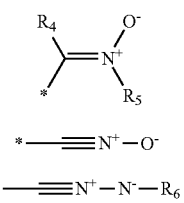

in which:
the symbol * represents the attachment of Q to A; and
$R_4$, $R_5$ and $R_6$ are independently selected from a hydrogen atom, a linear or branched $C_1$-$C_{20}$ alkyl, a $C_3$-$C_{30}$ cycloalkyl which is optionally substituted by a hydrocarbon-based chain, and a $C_6$-$C_{20}$ aryl which is optionally substituted by a hydrocarbon-based chain.

33. Process according to any one of points 23 to 33, in which the group A is a $C_6$-$C_{14}$ arenediyl ring optionally substituted by one or more hydrocarbon-based chains, which are identical or different, independent of one another, and are optionally substituted or interrupted by one or more heteroatoms.

34. Process according to point 33, in which the compound of formula (I) is selected from the compounds of formulae (Ia) and (Ib)

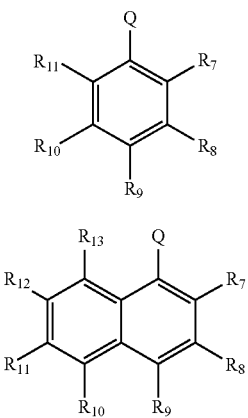

in which:
the group Q is as defined according to any one of points 23, 31 and 32;
one group selected from $R_7$ to $R_{11}$ of the formula (Ia) and one group selected from $R_7$ to $R_{13}$ of the formula (Ib) denotes the following group of formula (V):

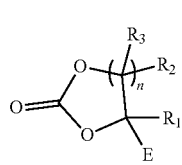

in which:
n, E, $R_1$, $R_2$ and $R_3$ are as defined in point 1,
the four other groups of the formula (Ia) and the six other groups of the formula (Ib), which are identical or different, independently of one another represent a hydrogen atom or a linear or branched, preferably saturated hydrocarbon-based chain which is optionally substituted or interrupted by one or more heteroatoms.

35. Process according to point 32, in which the compound of formula (I) is selected from the compounds of formula (VI)

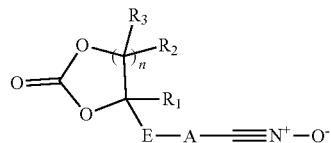

in which:
A represents an arenediyl ring, optionally substituted by one or more carbon-based chains, which are identical or different, independent of one another, and are optionally substituted or interrupted by one or more heteroatoms;

E represents a divalent hydrocarbon-based group which may optionally contain one or more heteroatoms;

$R_1$, $R_2$ and $R_3$ represent, independently of one another, a hydrogen atom or a hydrocarbon-based chain which is optionally substituted or interrupted by one or more heteroatoms; and n is an integer having a value greater than or equal to 1.

36. Process according to point 35, in which the group A is a $C_6$-$C_{14}$ arenediyl ring optionally substituted by one or more hydrocarbon-based chains, which are identical or different, independent of one another, and are optionally substituted or interrupted by one or more heteroatoms.

37. Process according to any one of points 23 to 36, in which n=1, 2, 3 or 4, preferentially n=1 or 2, more preferentially n=1.

38. Process according to any one of points 23 to 37, in which the group E is selected from a linear or branched, preferably saturated $C_1$-$C_{24}$, preferentially $C_1$-$C_{10}$, more preferentially $C_1$-$C_6$, hydrocarbon-based chain which is optionally interrupted by one or more nitrogen, sulfur or oxygen atoms.

39. Process according to any one of points 23 to 38, in which the group E is selected from the group consisting of —R— or —OR—, where R is a $C_1$-$C_{24}$, preferably $C_1$-$C_{10}$, more preferentially $C_1$-$C_6$, alkylene.

40. Process according to any one of points 23 to 39, in which the group E is selected from —$CH_2$—, —$CH_2$—$CH_2$—, —$CH_2$—$CH_2$—$CH_2$—, —$CH_2$—$CH_2$—$CH_2$—$CH_2$—, —O—$CH_2$—, —O—$CH_2$—$CH_2$—, —O—$CH_2$—$CH_2$—$CH_2$— and —O—$CH_2$—$CH_2$—$CH_2$—$CH_2$—.

41. Process according to any one of points 23 to 40, in which the groups $R_1$, $R_2$ and $R_3$ represent, independently of one another, a hydrogen atom or a linear or branched $C_1$-$C_{24}$, preferentially $C_1$-$C_{10}$, more preferentially $C_1$-$C_6$, alkyl.

42. Process according to any one of points 23 to 41, in which the group $R_1$ is a hydrogen atom and the groups $R_2$ and $R_3$, which are identical or different, are linear or branched $C_1$-$C_{24}$, preferentially $C_1$-$C_{10}$, more preferentially $C_1$-$C_6$, alkyls.

43. Polymer modified according to any one of points 23 to 42, in which the groups $R_1$, $R_2$ and $R_3$ are a hydrogen atom.

44. Process according to any one of points 35 to 43, in which the compound of formula (V) is selected from the group consisting of the compound of formula (VII) and the compound of formula (VIII)

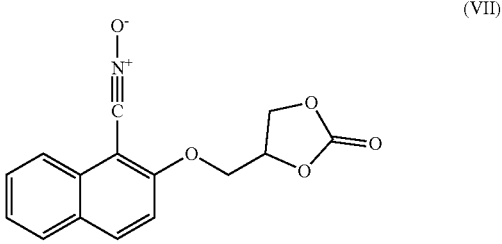

-continued

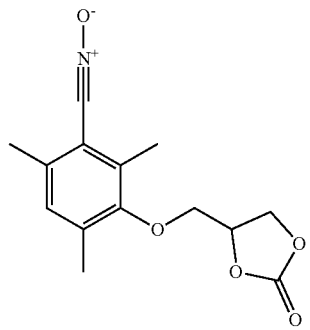

(VIII)

45. Composition comprising at least one modified polymer as defined in any one of points 1 to 22 and at least one additive.

The examples that follow illustrate the invention without, however, limiting it.

EXAMPLES

Determination of the Glass Transition Temperature

The glass transition temperature Tg of the polymers are measured by means of a differential calorimeter (differential scanning calorimeter) according to the standard ASTM D3418-08.

Characterizations of the Molecules

The structural analysis and also the determination of the molar purities of the molecules synthesized are carried out by an NMR analysis. The spectra are acquired on a Bruker Avance 3 400 MHz spectrometer equipped with a "5 mm BBFO Z-grad broad band" probe. The quantitative $^1$H NMR experiment uses a simple 300 pulse sequence and a repetition time of 3 seconds between each of the 64 acquisitions. The samples are dissolved in a deuterated solvent, deuterated dimethyl sulfoxide (DMSO), unless otherwise indicated. The deuterated solvent is also used for the "lock" signal. For example, calibration is carried out on the signal of the protons of the deuterated DMSO at 2.44 ppm with respect to a TMS reference at 0 ppm. The $^1$H NMR spectrum coupled with the 2D $^1$H/$^{13}$C HSQC and $^1$H/$^{13}$C HMBC experiments make possible the structural determination of the molecules (cf. assignment tables). The molar quantifications are carried out from the quantitative 1D $^1$H NMR spectrum.

Molecules Grafted to Diene Elastomer

The determination of the molar content of the grafted compound tested on a diene elastomer is carried out by an NMR analysis. The spectra are acquired on a 500 MHz Bruker spectrometer equipped with a "5 mm BBFO Z-grad CryoProbe" probe. The quantitative $^1$H NMR experiment uses a simple 30° pulse sequence and a repetition time of 5 seconds between each acquisition. The samples are dissolved in a deuterated solvent, deuterated chloroform (CDCl$_3$) unless indicated otherwise, with the aim of obtaining a "lock" signal. 2D NMR experiments made it possible to confirm the nature of the grafted unit by virtue of the chemical shifts of the carbon atoms and protons.

Measurement of the Number-Average (Mn) and Weight-Average (Mw) Molar Masses and of the Polydispersity Index of the Diene Elastomers Size exclusion chromatography (SEC) is used. SEC makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the molar mass distribution of an elastomer. The various number-average molar masses (Mn) and weight-average molar masses (Mw) may be determined from commercial standard products and the polydispersity index (PI=Mw/Mn) may be calculated via a "Moore" calibration.

There is no specific treatment for the elastomer sample before analysis. Said sample is simply dissolved to a concentration of about 1 g/l, in chloroform or in the following mixture: tetrahydrofuran+1 vol % of diisopropylamine+1 vol % of triethylamine+1 vol % of distilled water (vol %=% by volume). The solution is then filtered through a filter with a porosity of 0.45 µm before injection.

The apparatus used is a Waters Alliance chromatograph. The elution solvent is the following mixture: tetrahydrofuran+1 vol % of diisopropylamine+1 vol % of triethylamine or chloroform according to the solvent used for dissolving the elastomer. The flow rate is 0.7 ml/min, the temperature of the system is 35° C. and the analysis time is 90 min. A set of four Waters columns in series, having the commercial names Styragel HMW7, Styragel HMW6E and two Styragel HT6E, is used.

The volume of the solution of the elastomer sample injected is 100 µl. The detector is a Waters 2410 differential refractometer at a wavelength of 810 nm. The software for processing the chromatographic data is the Waters Empower system.

The calculated average molar masses are relative to a calibration curve produced from PSS Ready Cal-Kit commercial polystyrene standards.

Tensile Test:

These tests make it possible to determine the elasticity stresses and the properties at break after curing. Unless otherwise indicated, they are carried out in accordance with French standard NF T 46-002 of September 1988. The true secant moduli (i.e. calculated with reference to the real cross section of the test specimen), expressed in MPa, are measured in first elongation (that is to say without an accommodation cycle) at 100% elongation (moduli denoted M100) and 300% elongation (M300). All these tensile measurements are carried out under the standard conditions of temperature and hygrometry (23° C.±2° C., 50%±5% relative humidity).

The results are indicated in base 100, the arbitrary value of 100 being assigned to the control in order to then calculate and compare M100 of the different samples tested. The value in base 100 for the sample to be tested is calculated according to the operation: (value of M100 of the sample to be tested/value of M100 of the control)×100. The same calculation is performed for M300 and for the M300/M100 ratio. Of particular interest is the M300/M100 ratio, which gives an indication of the reinforcing properties. The higher the value of the M300/M100 ratio, the more the reinforcing properties are improved.

Dynamic Properties

The dynamic properties ΔG* and tan(δ)max are measured on a viscosity analyser (Metravib VA4000) according to standard ASTM D5992-96. The response of a sample of vulcanized composition (cylindrical test specimen with a thickness of 4 mm and with a cross section of 400 mm$^2$), subjected to a simple alternating sinusoidal shear stress, at a frequency of 10 Hz, at 60° C., is recorded. A strain amplitude sweep is carried out from 0.1% to 100% (outward cycle) and then from 100% to 0.1% (return cycle).

These same measurements are also carried out at a temperature of 100° C.

The results used are the difference in complex dynamic shear modulus between the values 0.1% and 100% strain at 60° C. ($\Delta G^*_{at\ 60°\ C.\ return}$; Payne effect) and the loss factor tan($\delta$).

For the outward cycle, the maximum value of tan($\delta$) at 60° C. denoted tan($\delta$)$_{max\ at\ 60°\ C.\ outward}$ is indicated. For the return cycle, the maximum value of tan($\delta$) at 100° C. denoted tan($\delta$)$_{max\ at\ 100°\ C.\ return}$ is indicated. The results are indicated in base 100, the arbitrary value of 100 being assigned to the control in order to then calculate and compare tan($\delta$)$_{max\ at\ 60°\ C.\ outward}$ of the different samples tested. The value in base 100 for the sample to be tested is calculated according to the operation: (tan($\delta$)$_{max\ at\ 60°\ C.\ outward}$ value of the sample to be tested/tan($\delta$)$_{max\ at\ 60°\ C.\ outward}$ value of the control)×100. In this way, a result of less than 100 indicates a reduction in hysteresis (hence an improvement in the hysteretic properties), which corresponds to an improvement in the rolling resistance performance.

The same calculation is performed for the values of tan($\delta$)$_{max\ at\ 100°\ C.\ return}$ and ($\Delta G^*_{at\ 60°\ C.\ return}$) in order to express the results in base 100.

A result of less than 100 for $\Delta G^*_{at\ 60°\ C.\ return}$ indicates a better dispersion of the reinforcing filler in the rubber composition.

I—Synthesis of Compounds D and I

I-A/Synthesis of Compound D: 2-((2-oxo-1,3-di-oxolan-4-yl)methoxy)-1-naphthonitrile oxide

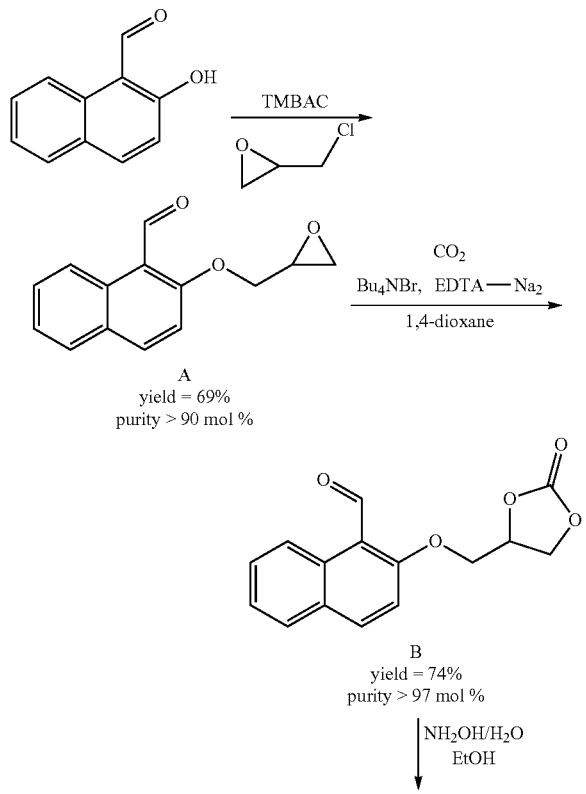

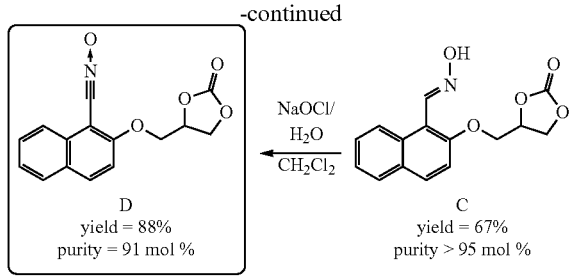

2-((2-Oxo-1,3-dioxolan-4-yl)methoxy)-1-naphthonitrile oxide is synthesized in 4 steps which are described below. All the chemical compounds used during this synthesis are obtained from "Sigma Aldrich".

Step 1: Preparation of 2-(oxiran-2-ylmethoxy)-1-naphthaldehyde (Compound A)

A solution of 2-hydroxy-1-naphthaldehyde (35.0 g; 0.203 mol) in epichlorohydrin (270 ml; 320.0 g; 3.456 mol; 17 eq.) is heated for 3-5 minutes at a temperature of 130° C., and then trimethylbenzylammonium chloride (TMBAC; 3.8 g; 0.020 mol; 0.1 eq.) is added. The reaction medium is heated to boiling (bath temperature=130-134° C.) and stirred at this temperature for 15 minutes. After this period, the solution is cooled to 30-40° C., then 400 ml of chloroform are added. The organic solution is washed 4 times with 150 ml of water and the organic phase is separated and then concentrated under reduced pressure (11 mbar, bath temperature=50° C.) to result in 76.58 g of an oil. This oily residue is taken up in 90 ml of 2-propanol and the mixture is stirred for 5 to 10 min. The suspension obtained is then placed for 4-5 hours at −18° C. The precipitate obtained is then filtered off and washed on the filter with cold 2-propanol (T=−18° C.) (3 times 20 ml). The product is dried at ambient temperature and under atmospheric pressure.

A white solid with a melting point of 94.0-97.5° C. is obtained with a yield of 69% (32.13 g; 0.141 mol). The molar purity is greater than 90% (1H NMR).

The 2-hydroxy-1-naphthaldehyde is commercially available. It can for example be obtained from "Sigma Aldrich" (CAS 708-06-5).

Step 2: Synthesis of 2-((2-oxo-1,3-dioxolan-4-yl)methoxy)-1-naphthaldehyde (Compound B)

Compound A, 2-(oxiran-2-ylmethoxy)-1-naphthaldehyde (16.5 g; 72.3 mmol), is mixed with tetrabutylammonium bromide (1.17 g; 3.61 mmol; 0.05 eq.) and sodium ethylenediaminetetraacetic acid dihydrate (1.17 g; 3.14 mmol; 0.04 eq.) in 500 ml of 1,4-dioxane. This mixture is heated at 100° C. (bath temperature) under a $CO_2$ atmosphere for 14-16 hours. $CO_2$ is added periodically by sparging of the medium to maintain a constant $CO_2$ pressure. After returning the mixture to ambient temperature, the precipitate is filtered off and washed on the filter with 1,4-dioxane (2 times 10 ml). The filtrate is concentrated under reduced pressure (75 mbar, bath temperature 45° C.) until a viscous residue is obtained (41.23 g). Ethyl acetate (20 ml) and petroleum ether (30 ml) are added (volume fraction 40/60). After 10-15 minutes of stirring at ambient temperature, the precipitate obtained is filtered off and washed on the filter with an ethyl acetate/petroleum ether mixture (2 times with an ethyl acetate/petroleum ether mixture: 5 ml/10 ml), then with water (3 times 10 ml) and finally with petroleum ether (20 ml). A white solid (16.85 g) is obtained with a yield of 86%.

This solid is then dissolved in ethyl alcohol (100 ml). After stirring for 10 min at boiling temperature and then returning to ambient temperature (23° C.), the reaction medium is cooled down to +4° C. and kept at this temperature for 15-20 hours. The precipitate is filtered off and washed on the filter with ethanol (2 times 10 ml) and then dried under air at ambient temperature. The desired product (white powder with a melting point of 158-159° C.) is obtained with a yield of 74% (14.52 g; 53.33 mmol) and a molar purity of greater than 97%.

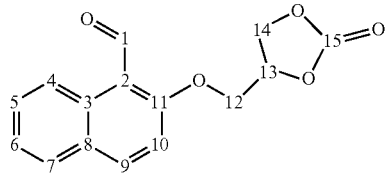

TABLE 1

| No. | δ $^1$H (ppm) | δ $^{13}$C (ppm) |
|---|---|---|
| 1 | 10.68 | 190.8 |
| 2 | / | 116.0 |
| 3 | / | 130.5 |
| 4 | 9.04 | 123.9 |
| 5 | 7.60 | 129.8 |
| 6 | 7.43 | 124.9 |
| 7 | 7.90 | 128.5 |
| 8 | / | 128.4 |
| 9 | 8.25 | 137.9 |
| 10 | 7.52 | 114.5 |
| 11 | / | 162.6 |
| 12 | 4.49-4.59 | 69.1 |
| 13 | 5.23 | 74.6 |
| 14 | 4.50-4.63 | 66.1 |
| 15 | / | 154.7 |

Solvent: DMSO

Step 3: Synthesis of 2-((2-oxo-1,3-dioxolan-4-yl)methoxy)-1-naphthaldehyde oxime (Compound C)

To a solution of compound B, 2-((2-oxo-1,3-dioxolan-4-yl)methoxy)-1-naphthaldehyde (5.00 g; 18.37 mmol), in ethanol (50 ml) at 35° C. (bath temperature) is added a solution of hydroxylamine (50% in solution in water; 1.82 g; 27.5 mmol; 1.5 eq.) in ethanol (5 ml). The reaction medium is heated to 40° C. and then stirred at this temperature for 8 hours. A second addition of a solution of hydroxylamine (50% in solution in water; 0.61 g; 9.2 mmol; 0.5 eq.) in ethanol (25 ml) is made. The reaction medium is stirred at 40° C. for 7 hours. After cooling to ambient temperature, the reaction medium is diluted by addition of water at 0° C. (450 ml) over a period of 15-20 minutes. After stirring for 10 minutes, the precipitate is filtered off and washed on the filter with water (2 times 10 ml).

A white solid with a melting point of 182-183° C. is obtained with a yield of 67% (3.52 g; 12.25 mmol) and a molar purity of greater than 95%.

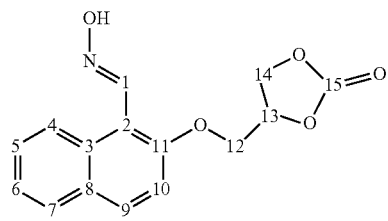

TABLE 2

| No. | δ $^1$H (ppm) | δ $^{13}$C (ppm) |
|---|---|---|
| 1 | 8.60 | 144.8 |
| 2 | / | 114.2 |
| 3 | / | 130.7 |
| 4 | 8.82 | 125.7 |
| 5 | 7.49 | 127.6 |
| 6 | 7.37 | 124. |
| 7 | 7.85 | 128.3 |
| 8 | / | 129.1 |
| 9 | 7.95 | 131.5 |
| 10 | 7.42 | 114.6 |
| 11 | / | 154.9 |
| 12 | 4.36-4.46 | 69.0 |
| 13 | 5.17 | 74.8 |
| 14 | 4.41-4.62 | 65.9 |
| 15 | / | 154.7 |

Solvent: DMSO

Step 4: Synthesis of 2-((2-oxo-1,3-dioxolan-4-yl)methoxy)-1-naphthonitrile oxide (Compound D)

To a suspension of 2-((2-oxo-1,3-dioxolan-4-yl)methoxy)-1-naphthaldehyde oxime (product C) (3.42 g; 11.91 mmol) in dichloromethane (75 ml) at a temperature of +1° C. is added dropwise an aqueous solution of NaOCl in water (21.5 ml; 19.05 mmol; 1.6 eq.; >4% active chlorine solution) for 3-5 minutes. The reaction medium is stirred for 70-80 minutes at this temperature. The precipitate is filtered off and washed on the filter with $CH_2Cl_2$ (10 ml), then with water (2 times 15 ml) and lastly with a dichloromethane/petroleum ether mixture (volume fraction 50/50) (10 ml/10 ml). After drying under atmospheric pressure and at ambient temperature, a white solid with a melting point of 157-158° C. is obtained with a yield of 88% (2.976 g; 10.43 mmol) and a purity of greater than 91 mol %.

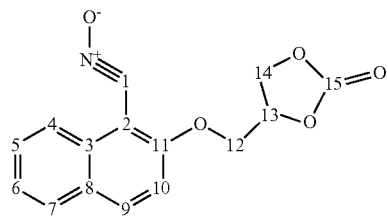

TABLE 3

| No. | δ $^1$H (ppm) | δ $^{13}$C (ppm) |
|---|---|---|
| 1 | / | / |
| 2 | / | 95.6 |

TABLE 3-continued

| No. | δ $^1$H (ppm) | δ $^{13}$C (ppm) |
|---|---|---|
| 3 | / | 133.2 |
| 4 | 7.87 | 123.3 |
| 5 | 7.64 | 129.1 |
| 6 | 7.47 | 125.2 |
| 7 | 7.96 | 128.7 |
| 8 | / | 128.3 |
| 9 | 8.14 | 133.3 |
| 10 | 7.53 | 114.2 |
| 11 | / | 159.9 |
| 12 | 4.49-4.60 | 68.9 |
| 13 | 5.19 | 74.6 |
| 14 | 4.41-4.62 | 65.8 |
| 15 | / | 154.6 |

Solvent DMSO

I-b/Synthesis of Compound I: 2,4,6-trimethyl-3-((2-oxo-1,3-dioxolan-4-yl)methoxy)benzonitrile oxide 2,4,6-Trimethyl-3-((2-oxo-1,3-dioxolan-4-yl)methoxy)benzonitrile oxide is synthesized in 5 steps described below. All the chemical compounds used during this synthesis are obtained from "Sigma Aldrich".

Step 1: Preparation of 3-hydroxy-2,4,6-trimethylbenzaldehyde (Compound E)

This compound can be obtained from mesitol and dichloromethyl methyl ether (DCMME) according to a procedure described in the following article: Yakubov, A. P.; Tsyganov, D. V.; Belen'kii, L. I.; Krayushkin, M. M. Bulletin of the Academy of Sciences of the USSR, Division of the Chemical Science (English Translation); vol. 40; no. 7.2; (1991); pp. 1427-1432; Izvestiya Akademii Nauk SSSR, Seriya Khimicheskaya; no. 7; (1991); pp. 1609-1615.

Compound E having a melting point of 108-109° C. is obtained with a yield of 83% and a molar purity of greater than 90% ($^1$H NMR).

The mesitol is commercially available. It can for example be obtained from "Sigma-Aldrich" (CAS 527-60-6).

Step 2: Preparation of 2,4,6-trimethyl-3-(oxiran-2-ylmethoxy)benzaldehyde (Compound F)

To the mixture of compound E, 3-hydroxy-2,4,6-trimethylbenzaldehyde (30.00 g; 0.183 mol), and epichlorohydrin (42.3 g; 0.457 mol) in acetonitrile (80 ml) is added potassium carbonate (37.9 g; 0.274 mol). The reaction medium is heated for 3 hours at a temperature of 60° C. and then for 2.5-3 hours at a temperature of 70° C. After cooling to a temperature of 40-50° C., the reaction medium is diluted with a mixture of water (250 ml) and ethyl acetate (250 ml) and is stirred for 10 minutes. The organic phase is separated and washed with water (4 times 100 ml). The solvent is evaporated under reduced pressure (bath temperature=40° C.; 12 mbar). A yellow oil (39.116 g) is obtained.

After separation by column chromatography (SiO$_2$; ethyl acetate (EA):petroleum ether (PE)=1:4) and recovery of the fractions of the product of interest, the solvents are evaporated under reduced pressure (bath temperature=40° C.; 11 mbar). Petroleum ether (150 ml) is added to the residue obtained after evaporation and this mixture is placed at −18° C. for 2 hours. The precipitate obtained is filtered off, washed with petroleum ether (3 times 25 ml) and lastly dried in air.

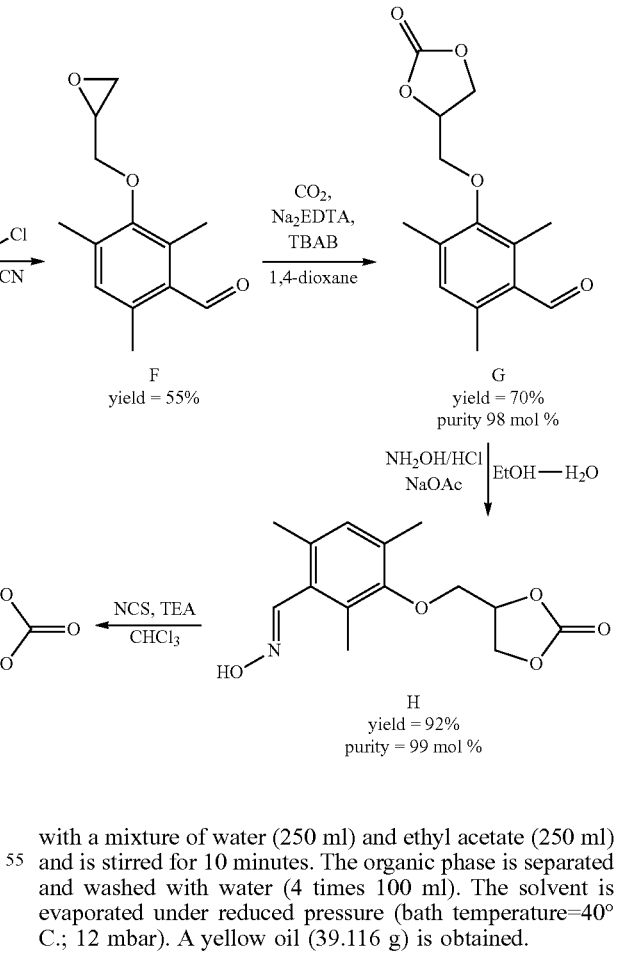

A white solid (21.916 g) is obtained with a yield of 55%.

Step 3: Preparation of 2,4,6-trimethyl-3-((2-oxo-1,3-dioxolan-4-yl)methoxy)benzaldehyde (Compound G)

Compound F, 2,4,6-trimethyl-3-(oxiran-2-ylmethoxy)benzaldehyde (5.00 g; 22.70 mmol) is mixed with tetra-n-butylammonium bromide (TBAB; 0.366 g; 1.135 mmol) and $Na_2EDTA$ dihydrate (0.422 g; 1.135 mmol) in 100 ml of 1,4-dioxane at a bath temperature equal to 110° C. under $CO_2$ atmosphere. $CO_2$ is added periodically by sparging of the medium for 7-8 hours to keep the $CO_2$ pressure constant. Internal pressure is maintained by a balloon. A conversion of 60-65% is achieved after 14 hours. After cooling to a temperature of 60° C., the precipitate is filtered off and washed with 1,4-dioxane (2 times 5 ml). The filtrate is concentrated under reduced pressure (bath temperature=50° C.; 30 mbar) to result in 5.323 g of a brown oil.

After separation by column chromatography ($SiO_2$; ethyl acetate:petroleum ether=1:1) and recovery of the fractions of the product of interest, the solvents are evaporated under reduced pressure (bath temperature=40° C.; 20 mbar). Petroleum ether (5 ml) is added to bring about rapid precipitation. The precipitate is filtered off, washed with petroleum ether (2 times 5 ml) and lastly dried in air.

A white solid (1.835 g) is obtained with a yield of 31%. The molar purity is greater than 98% ($^1H$ NMR).

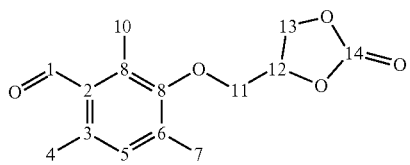

TABLE 4

| No. | δ $^1H$ (ppm) | δ $^{13}C$ (ppm) |
|---|---|---|
| 1 | 10.38 | 193.7 |
| 2 | / | 131.5 |
| 3 | / | 136.3 |
| 4 | 2.41 | 19.3 |
| 5 | 6.96 | 131.7 |
| 6 | / | 136.3 |
| 7 | 2.20 | 16.1 |
| 8 | / | 152.7 |
| 9 | / | 133.1 |
| 10 | 2.39 | 11.7 |
| 11 | 3.92 | 71.3 |
| 12 | 5.07 | 75.3 |
| 13 | 4.41-4.60 | 65.8 |
| 14 | / | 154.8 |

Solvent DMSO

Step 4: Preparation of 2,4,6-trimethyl-3-((2-oxo-1,3-dioxolan-4-yl)methoxy)benzaldehyde oxime (Compound H)

To a suspension of compound G, 2,4,6-trimethyl-3-((2-oxo-1,3-dioxolan-4-yl)methoxy)benzaldehyde (1.200 g; 4.54 mmol), in ethanol (50 ml), is added, at ambient temperature, a solution of sodium acetate (0.559 g; 6.81 mmol) and hydroxylamine hydrochloride (0.473 g; 6.81 mmol) in water (50 ml). The reaction mixture is stirred at ambient temperature for 3 hours. Next, a volume of water at 0° C. (50 ml) is added and the mixture is left to stir for an additional 15 minutes. The precipitate obtained is filtered off, washed with water (3 times 30 ml) and dried in air.

A white solid (1.161 g) having a melting point of 144-145° C. is obtained with a yield of 92%. The molar purity is greater than 98% ($^1H$ NMR).

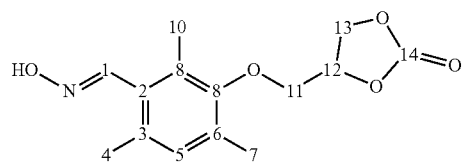

TABLE 5

| No. | δ $^1H$ (ppm) | δ $^{13}C$ (ppm) |
|---|---|---|
| 1 | 8.31 | 147.4 |
| 2 | / | 129.4 |
| 3 | / | 132.4 |
| 4 | 2.19 | 20.12 |
| 5 | 6.87 | 130.5 |
| 6 | / | 130.4 |
| 7 | 2.15 | 15.7 |
| 8 | / | 152.4 |
| 9 | / | 129.4 |
| 10 | 2.18 | 13.0 |
| 11 | 3.89 | 71.1 |
| 12 | 5.05 | 75.4 |
| 13 | 4.40-4.59 | 65.8 |
| 14 | / | 154.8 |

Solvent DMSO

Step 5: synthesis of 2,4,6-trimethyl-3-((2-oxo-1,3-dioxolan-4-yl)methoxy)benzonitrile oxide (Compound I)

To a suspension of compound H, 2,4,6-trimethyl-3-((2-oxo-1,3-dioxolan-4-yl)methoxy)benzaldehyde oxime (1.01 g; 3.62 mmol) in $CHCl_3$ (50 ml) cooled down to 0-2° C., is added TEA (0.476 g; 4.70 mmol) in one stage and N-chlorosuccinimide (NCS, 0.531 g; 3.98 mmol) in portions over 1-2 minutes. The reaction mixture is stirred at between 0-3° C. for 1 hour. The organic phase is then washed with water (4 times 100 ml) and concentrated under reduced pressure (bath temperature=25° C.; 10 mbar) to obtain a yellow oil (1.606 g). Methyl tert-butyl ether (MTBE, 5 ml) is then added. The precipitate obtained is filtered off, washed with MTBE:petroleum ether=1:1 (2 times 5 ml) and dried in air.

A white solid (0.912 g) with a melting point of 128-129° C. is obtained with a yield of 91%. The molar purity is greater than 94% ($^1H$ NMR).

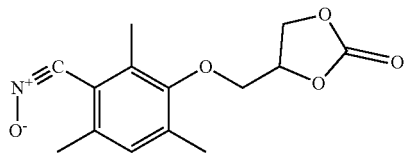 [SMILES: Cc1cc(C)c(OCC2COC(=O)O2)c(C)c1C#[N+][O-]]

TABLE 6

| No. | δ ¹H (ppm) | δ ¹³C (ppm) |
|---|---|---|
| 1 | / | / |
| 2 | / | 112.3 |
| 3 | / | 137.3 |
| 4 | 2.28 | 19.7 |
| 5 | 7.03 | 130.3 |
| 6 | / | 134.4 |
| 7 | 2.18 | 15.9 |
| 8 | / | 152.3 |
| 9 | / | 134.1 |
| 10 | 2.27 | 14.3 |
| 11 | 3.94 | 65.7 |
| 12 | 5.06 | 75.2 |
| 13 | 4.39-4.58 | 71.3 |
| 14 | / | 154.8 |

Solvent: DMSO

II Grafting of Polymers with Compounds D and I

II-a/Manufacture of a Styrene/Butadiene (SBR) Copolymer Grafted by 2-((2-oxo-1,3-dioxolan-4-yl)methoxy)-1-naphthonitrile oxide (Compound D)

2-((2-Oxo-1,3-dioxolan-4-yl)methoxy)-1-naphthonitrile oxide (compound D) (0.35 g; 1.21 mmol) is incorporated into 15 g of SBR (containing 26.5% by weight of styrene relative to the total weight of the copolymer and 24% by weight of 1,2-butadiene units relative to the weight of the butadiene part, 28% of cis-1,4-butadiene units relative to the weight of the butadiene part and 48% of trans-1,4-butadiene units relative to the weight of the butadiene part, with an Mn=120 000 g/mol and PI=1.22) on an open mill (external mixer at 23° C.). The mixture is homogenized in 15 turnover passes. This mixing phase is followed by a heat treatment at 120° C. for 10 minutes under a press at a pressure of 10 bar.

The results of the grafting according to ¹H NMR analysis are presented in the table below.

II-b/Manufacture of a Synthetic Polyisoprene (IR) Grafted by 2-((2-oxo-1,3-dioxolan-4-yl)methoxy)-1-naphthonitrile oxide (Compound D)

2-((2-Oxo-1,3-dioxolan-4-yl)methoxy)-1-naphthonitrile oxide (0.32 g; 1.1 mmol) is incorporated into 15 g of synthetic polyisoprene (containing 99.35% by weight of cis-1,4-isoprene units and 0.65% of 3,4-isoprene units, with an Mn=550 000 g/mol and PI=2.4) on an open mill (external mixer at 23° C.). The mixture is homogenized in 15 turnover passes. This mixing phase is followed by a heat treatment at 120° C. for 10 minutes under a press at a pressure of 10 bar.

The results of the grafting according to ¹H NMR analysis are presented in the table below.

II-c/Manufacture of a Natural Rubber (NR) Grafted by 2-((2-oxo-1,3-dioxolan-4-yl)methoxy)-1-naphthonitrile oxide (Compound D)

2-((2-Oxo-1,3-dioxolan-4-yl)methoxy)-1-naphthonitrile oxide (0.32 g; 1.1 mmol) is incorporated into 15 g of a natural rubber on an open mill (external mixer at 23° C.). The mixture is homogenized in 15 turnover passes. This mixing phase is followed by a heat treatment at 120° C. for 10 minutes under a press at a pressure of 10 bar.

The results of the grafting according to ¹H NMR analysis are presented in the table below.

II-d/Manufacture of an Ethylene/Butadiene (EBR) Copolymer Grafted by 2-((2-oxo-1,3-dioxolan-4-yl)methoxy)-1-naphthonitrile oxide (Compound D)

2-((2-Oxo-1,3-dioxolan-4-yl)methoxy)-1-naphthonitrile oxide (0.451 g; 1.44 mmol) is incorporated into 15 g of EBR (containing 80 mol % of ethylene and 20 mol % of butadiene, with an Mn=187 000 g/mol and PI=1.36) on an open mill (external mixer at 23° C.). The mixture is homogenized in 15 turnover passes. This mixing phase is followed by a heat treatment at 120° C. for 10 minutes under a press at a pressure of 10 bar.

The results of the grafting according to ¹H NMR analysis are presented in the table below.

TABLE 7

| Elastomer | Targeted degree of grafting (mol %) | Degree of compound D grafted (mol %) | Grafting yield (in %) |
|---|---|---|---|
| SBR | 0.50 | 0.40 | 80 |
| IR | 0.50 | 0.14 | 28 |
| NR | 0.50 | 0.10 | 20 |
| EBR | 0.35 | 0.14 | 40 |

II-e/Manufacture of a Synthetic Polyisoprene (IR) Grafted by 2,4,6-trimethyl-3-((2-oxo-1,3-dioxolan-4-yl)methoxy)benzonitrile oxide (Compound I)

2,4,6-Trimethyl-3-((2-oxo-1,3-dioxolan-4-yl)methoxy)benzonitrile oxide (0.3 g; 1.1 mmol) is incorporated into 15 g of synthetic polyisoprene (containing 99.35% by weight of cis-1,4-isoprene units and 0.65% of 3,4-isoprene units, with an Mn=375 000 g/mol and PI=3.6) on an open mill (external mixer at 23° C.). The mixture is homogenized in 15 turnover passes. This mixing phase is followed by a heat treatment at 120° C. for 10 minutes under a press at a pressure of 10 bar.

The results of the grafting according to ¹H NMR analysis are presented in the table below.

II-f/Manufacture of a Styrene/Butadiene (SBR) Copolymer Grafted by 2,4,6-trimethyl-3-((2-oxo-1,3-dioxolan-4-yl)methoxy)benzonitrile oxide (Compound I)

2,4,6-Trimethyl-3-((2-oxo-1,3-dioxolan-4-yl)methoxy)benzonitrile oxide (compound I) (0.34 g; 1.21 mmol) is incorporated into 15 g of SBR (containing 26.5% by weight of styrene relative to the total weight of the copolymer and 24% by weight of 1,2-butadiene units relative to the weight of the butadiene part, 28% of cis-1,4-butadiene units relative to the weight of the butadiene part and 48% of trans-1,4-butadiene units relative to the weight of the butadiene part, with an Mn=120 000 g/mol and PI=1.22) on an open mill (external mixer at 23° C.). The mixture is homogenized in 15 turnover passes. This mixing phase is followed by a heat treatment at 120° C. for 10 minutes under a press at a pressure of 10 bar.

The results of the grafting according to ¹H NMR analysis are presented in the table below.

TABLE 8

| Elastomer | Targeted degree of grafting (mol %) | Degree of compound I grafted (mol %) | Grafting yield (in %) |
|---|---|---|---|
| SBR | 0.50 | 0.50 | 100 |
| IR | 0.50 | 0.18 | 36 |

III—Rubber Composition

III-1/Preparation of the Rubber Compositions

The aim of this test is to demonstrate the improved performance of rubber compositions comprising a grafted polymer bearing pendant cyclic carbonate functions in accordance with the invention compared to a rubber composition comprising an ungrafted polymer and compared to a rubber composition comprising a polymer bearing pendant cyclic carbonate functions which is obtained by the radical route (prior art polymer).

Three compositions are thus prepared according to the process described below, based on an SBR elastomer, predominantly reinforced by silica; these compositions differ from one another as follows:

The control composition T1, not in accordance with the invention, comprising an elastomer A which is an ungrafted (unmodified) SBR containing 26.5% by weight of styrene relative to the total weight of the elastomer, and 24% by weight of 1,2-butadiene units relative to the weight of the butadiene part; of Mn=120 000 g/mol and polydispersity index PI=1.22 and having a Tg=−48° C.;

Composition C1, not in accordance with the invention, comprises an elastomer B possessing pendant cyclic carbonate functions, obtained by radical polymerization; the molar content of cyclic carbonate functions in this elastomer is 2.6%;

Composition C2, in accordance with the invention, comprising the elastomer C possessing pendant cyclic carbonate functions, obtained by grafting the compound D.

Obtaining the Elastomer B (not in Accordance with the Invention)

The terpolymer of styrene, butadiene and 4-(hydroxymethyl)-1,3-dioxolan-2-one methacrylate (CCMA) is synthesized by cold radical polymerization in accordance with examples II-2 and II-3 of the document WO 2018015646 (test no. 1). This protocol is repeated below.

Prior preparation of the following feedstocks:
Suspension in water of $Na_2FeP_2O_7$ at 0.0627 mol/l: $FeSO_4$, $7H_2O$ and $Na_4P_2O_7$ are diluted in sparged water, then the mixture is heated at 60° C. for 45 minutes with regular stirring,
Preparation of a solution of cumene hydroperoxide in styrene at 0.079 mol/l,
Preparation of a solution of mercaptan (R—SH) in styrene at 0.223 mol/l,
Preparation of a solution of N,N-diethylhydroxylamine in water at 10 g/l.

The reactor is loaded according to the following operations:
introduce the sparged water over half an hour at 25° C. (final volume 22.3 ml)
then sodium dodecyl sulfate (SDS) under nitrogen at 25° C. followed by 10 min nitrogen flushing (0.3 g)
inject the styrene feedstock containing the R—SH at 25° C. under nitrogen (1 ml of solution at 0.223 mol/l)
cool the reactor to reach 5° C.
when the reactor reaches approximately 12° C., inject the rest of the styrene (1.815 ml, 1.65 g) and the CCMA (0.39 ml, 0.56 g), under nitrogen
then inject the butadiene feedstock (9.88 ml, 6.42 g)
leave the reactor to cool down to 5° C., then inject the solution of $Na_2FeP_2O_7$ (1.7 ml of solution at 0.0627 mol/l)
wait 5 minutes, then inject the initiator and the solution of cumene hydroperoxide in styrene (0.5 ml)

The end of the addition of the initiator marks the start of the polymerization (i.e. t=0 min).

Stirring is maintained at 5° C. for 7 hours 15 min to reach approximately 63% of final conversion.

Finally, a stopping solution of N,N-diethylhydroxylamine in water is prepared. The latex is then stopped by decanting by residual pressure of the monomers on this stopping solution. The latex is subsequently coagulated by addition of 50 ml of acetone. The coagulum is dried under partial vacuum and under nitrogen flushing for 48 hours at 40° C.

The operating conditions for this test are listed in the following table.

TABLE 9

| Water | | 22.3 ml |
|---|---|---|
| SDS | 3 phr | 0.3 g |
| RSH | 0.16 phr | 0.016 g |
| $FeSO_4$, $7H_2O$ | 0.28 phr | 0.028 g |
| $Na_4P_2O_7$ | 0.266 phr | 0.026 g |
| % by mass of styrene (mol %) | 30.14% (19%) | 3.014 g |
| % by mass of butadiene (mol %) | 64.23% (79%) | 6.42 g |
| % by mass of CCMA (mol %) | 5.63% (2%) | 0.56 g |
| Cumene hydroperoxide | 0.17 phr | 0.017 g |
| N,N-diethylhydroxylamine | 0.1 phr | 0.01 g |

The characteristics of the elastomer obtained are reported in the following table. The macrogel content is determined in accordance with the method described on page 15 in document WO 2018/015646. The NMR characterization of this elastomer is carried out in accordance with the protocol described on pages 15 and 16 in document WO 2018/015646.

TABLE 10

| | SEC characterizations | | | DSC characterization | | |
|---|---|---|---|---|---|---|
| | Mn (Kg/mol) | PI | Gel content (%) | CCMA Mol % | Styrene Mol % | Butadiene Mol % | Tg in ° C. |
| Elastomer B | 83 | 3.9 | <0.3 | 2.6 | 16.2 | 81.2 | −48 |

Obtaining the Grafted Elastomer C (in Accordance with the Invention)

2-((2-Oxo-1,3-dioxolan-4-yl)methoxy)-1-naphthonitrile oxide (6.908 g; 24.2 mmol; 92 mol % purity) is incorporated into 50 g of SBR (elastomer A) on an open mill (external mixer at 23° C.). The mixture is homogenized in 15 turnover passes. This mixing phase is followed by a heat treatment at 120° C. for 10 minutes under a press at a pressure of 10 bar.

$^1$H NMR analysis made it possible to measure a molar degree of grafting of 2-((2-oxo-1,3-dioxolan-4-yl)methoxy)-1-naphthonitrile oxide which is equal to 2.6% and a molar grafting yield which is equal to 94%.

2-((2-Oxo-1,3-dioxolan-4-yl)methoxy)-1-naphthonitrile oxide is the compound D for which the synthesis protocol has been described above.

Preparation of the Rubber Compositions

The grafted or ungrafted elastomer or the elastomer obtained by radical polymerization, the reinforcing filler, and the other additives, with the exception of the vulcanization system, are successively introduced into an 85 cm³ Polylab internal mixer, the final degree of filling of which is approximately 70% by volume and the initial vessel temperature of which is approximately 100° C. Thermomechanical working is then performed (non-productive phase) in one step (total duration of the kneading equal to about 5 min), until a maximum "dropping" temperature ranging from 145 to 165° C. is reached. The mixture thus obtained is recovered and cooled and the vulcanization system is then added on an external mixer in order to carry out a second mechanical working phase on this mixer at approximately 80° C. for approximately 5 to 6 min.

The compositions thus obtained are subsequently calendered, either in the form of slabs having a thickness of 2 to 3 mm or of thin sheets of rubber for the measurement of their physical or mechanical properties.

The formulation of the rubber compositions is given in the following table and their properties after curing (approximately 60 min at 150° C.) are presented in the table below. The amounts are expressed in parts per 100 parts by weight of elastomer (phr).

TABLE 11

| Composition | T1 | C1 | C2 |
|---|---|---|---|
| Elastomer A | 100 | (-) | (-) |
| Elastomer B | (-) | 100 | (-) |
| Elastomer C | (-) | (-) | 100 |
| Carbon black (1) | 1 | 1 | 1 |
| Silica (2) | 67 | 67 | 67 |
| Plasticizing resin (3) | 31 | 31 | 31 |
| Antioxidant (4) | 3 | 3 | 3 |
| Paraffin | 1 | 1 | 1 |
| Covering agent (5) | 5.36 | 5.36 | 5.36 |
| Diphenylguanidine (6) | 2.5 | 2.5 | 2.5 |
| Stearic acid (7) | 3 | 3 | 3 |
| ZnO (8) | 0.9 | 0.9 | 0.9 |
| Sulfur | 2.3 | 2.3 | 2.3 |
| CBS (9) | 1 | 1 | 1 |

(1) ASTM N234 grade carbon black sold by Cabot;
(2) Zeosil 1165 MP silica from Solvay with a BET specific surface area of 160 m²/g;
(3) Hydrogenated C9/dicyclopentadiene resin E5600 BR sold by Exxon Mobil;
(4) 1,3-Dimethylbutyl-N-phenyl-para-phenylenediamine (Santoflex 6-PPD sold by Flexsys);
(5) Trimethoxy(octyl)silane sold by Sigma Aldrich;
(6) Diphenylguanidine (Perkacit DPG from Flexsys);
(7) Stearin (Pristerene 493-from Uniqema);
(8) Zinc oxide (industrial grade-from Umicore);
(9) N-Cyclohexyl-2-benzothiazolesulfenamide (Santocure CBS from Flexys).

TABLE 12

|  | T1 | C1 | C2 |
|---|---|---|---|
| $\Delta G^*_{at\ 60°\ C.\ return}$ | 100 | 66 | 18 |
| $Tan(\delta)_{max\ at\ 60°\ C.\ outward}$ | 100 | 86 | 68 |
| $Tan(\delta)_{max\ at\ 100°\ C.\ return}$ | 100 | n.m. | 44 |
| M100 at 23° C. | 100 | 193 | 277 |
| M300 at 23° C. | 100 | 282 | 613 |
| M300/M100 at 23° C. | 100 | 147 | 221 | n.m.= not measured

In the light of the table above, it is observed, as expected, that the composition C1 not in accordance with the invention, comprising an elastomer possessing pendant cyclic carbonate functions obtained by the radical route, exhibits a reduction in hysteresis ($Tan(\delta)_{max\ at\ 60°\ C.\ outward}$) compared to the control composition T1, and therefore improved hysteretic properties compared to the control composition T1 not comprising any modified elastomer. The non-conforming composition C1 also exhibits improved reinforcing properties (increase in the M300/M100 ratio) compared to the control composition T1.

Surprisingly, the composition C2, in accordance with the invention, comprising an elastomer possessing pendant cyclic carbonate functions obtained by post-polymerization grafting exhibits hysteretic properties and reinforcing properties that are significantly improved compared to the control composition T1 and the composition C1 not in accordance with the invention.

The invention claimed is:

1. A modified polymer obtained by grafting at least one compound of formula (I) to at least one unsaturation of a chain of an initial polymer

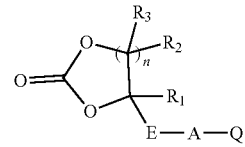

in which:
Q represents a dipole comprising at least one nitrogen atom;
A represents an arenediyl ring, optionally substituted by one or more hydrocarbon-based chains, which are identical or different, independent of one another, and are optionally substituted or interrupted by one or more heteroatoms;
E represents a divalent hydrocarbon-based bonding group which may optionally contain one or more heteroatoms;
$R_1$, $R_2$ and $R_3$ represent, independently of one another, a hydrogen atom or a hydrocarbon-based chain which is optionally substituted or interrupted by one or more heteroatoms; and
n is an integer having a value greater than or equal to 1.

2. The modified polymer according to claim 1, wherein the initial polymer is an elastomer.

3. The modified polymer according to claim 2, wherein the initial polymer is a diene elastomer is selected from the group consisting of ethylene/propylene/diene monomer copolymers, butyl rubber, natural rubber, synthetic polyisoprenes, polybutadienes, butadiene copolymers, isoprene copolymers and mixtures thereof.

4. The modified polymer according to claim 1, wherein a molar degree of grafting of the compound of formula (I) is within a range extending from 0.01% to 15%.

5. The modified polymer according to claim 1, wherein Q is a group of formula (II), (III) or (IV)

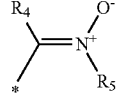

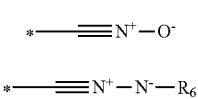

in which:
the symbol * represents attachment of Q to A; and
$R_4$, $R_5$ and $R_6$ are independently selected from the group consisting of a hydrogen atom, a linear or branched $C_1$-$C_{20}$ alkyl, a $C_3$-$C_{30}$ cycloalkyl which is optionally substituted by a hydrocarbon-based chain, and a $C_6$-$C_{20}$ aryl which is optionally substituted by a hydrocarbon-based chain.

6. The modified polymer according to claim 1, wherein A is a $C_6$-$C_{14}$ arenediyl ring optionally substituted by one or more hydrocarbon-based chains, which are identical or different, independent of one another, and are optionally substituted or interrupted by one or more heteroatoms.

7. The modified polymer according to claim 1, wherein the compound of formula (I) is selected from the group consisting of compounds of formulae (Ia) and (Ib)

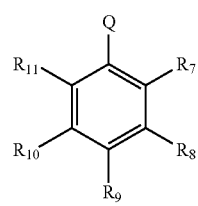

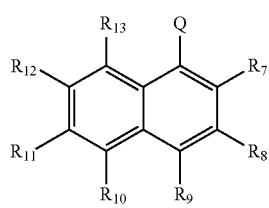

in which:
one group selected from $R_7$ to $R_{11}$ of the formula (Ia) and one group selected from $R_7$ to $R_{13}$ of the formula (Ib) denotes the following group of formula (V):

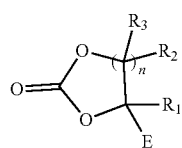

in which:
R groups other than the one group selected from $R_7$ to $R_{11}$ of the formula (Ia) and R groups other than the one group selected from $R_7$ to $R_{13}$ of the formula (Ib) which are identical or different, independently of one another represent a hydrogen atom or a linear or branched, hydrocarbon-based chain which is optionally substituted or interrupted by one or more heteroatoms.

8. The modified polymer according to claim 5, wherein the compound of formula (I), when Q is a nitrile oxide, is selected from the compounds of formula (VI)

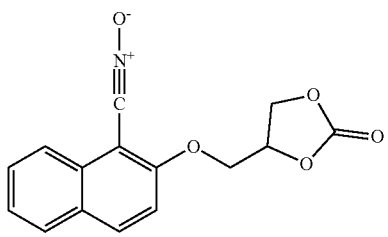

in which:
E represents a divalent hydrocarbon-based bonding group which may optionally contain one or more heteroatoms;
$R_1$, $R_2$ and $R_3$ represent, independently of one another, a hydrogen atom or a hydrocarbon-based chain which is optionally substituted or interrupted by one or more heteroatoms; and
n is an integer having a value greater than or equal to 1.

9. The modified polymer according to claim 1, wherein n=1, 2, 3 or 4.

10. The modified polymer according to claim 1, wherein E is selected from the group consisting of —R— and —OR—, where R is a linear or branched $C_1$-$C_{24}$ alkylene.

11. The modified polymer according to claim 1, wherein $R_1$, $R_2$ and $R_3$ represent, independently of one another, a hydrogen atom or a linear or branched $C_1$-$C_{24}$ alkyl.

12. The modified polymer according to claim 1, wherein the compound of formula (I) is selected from the group consisting of the compound of formula (VII) and the compound of formula (VIII)

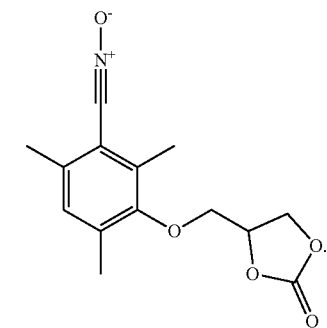

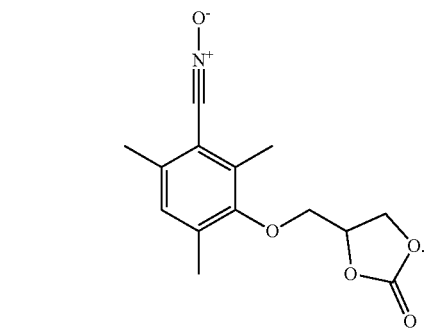

13. A process for preparing the modified polymer according to claim 1, the process process comprising a step of:
grafting, to the initial polymer comprising at least one unsaturation, the compound of formula (I) by [3+2] cycloaddition of Q of the compound of formula (I) to the unsaturation.

14. The process according to claim 13, wherein the compound of formula (I) is selected from the group consisting of the compound of formula (VII) and the compound of formula (VIII)

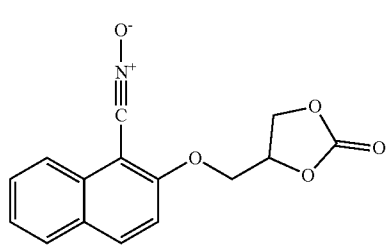
(VII)
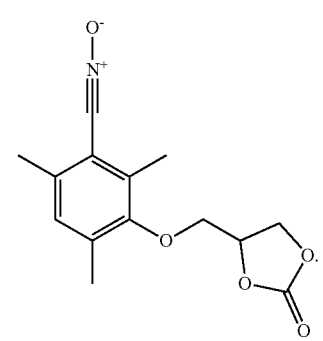
(VIII)
15. A composition comprising at least one modified polymer according to claim 1 and at least one additive.
* * * * *